US010543905B1

(12) United States Patent
Kwon et al.

(10) Patent No.: US 10,543,905 B1
(45) Date of Patent: Jan. 28, 2020

(54) BATTERY SHIFTING FOR CENTER OF GRAVITY CONTROL

(71) Applicant: Kitty Hawk Corporation, Mountain View, CA (US)

(72) Inventors: Dennis Young Kwon, San Jose, CA (US); Madeline Elliott Parker, Aspen, CO (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/267,875

(22) Filed: Feb. 5, 2019

(51) Int. Cl.
*B64C 17/02* (2006.01)
*B64D 27/24* (2006.01)
*B64C 27/20* (2006.01)

(52) U.S. Cl.
CPC .............. *B64C 17/02* (2013.01); *B64D 27/24* (2013.01); *B64C 27/20* (2013.01)

(58) Field of Classification Search
CPC .............. B64C 17/02; B64C 2201/042; B64C 2201/066; B64D 27/24
See application file for complete search history.

(56) References Cited

U.S. PATENT DOCUMENTS

| 6,913,228 | B2 | 7/2005 | Lee | |
|---|---|---|---|---|
| 8,226,040 | B2 | 7/2012 | Neto | |
| 9,340,299 | B2* | 5/2016 | Yates | B64D 39/00 |
| 9,650,138 | B2* | 5/2017 | Yates | B64D 33/00 |
| 9,815,563 | B2* | 11/2017 | Yates | B64D 39/00 |
| 10,322,783 | B2* | 6/2019 | Valsvik | G01V 1/3808 |
| 2007/0215750 | A1* | 9/2007 | Shantz | A63H 27/12 244/17.23 |
| 2008/0099079 | A1 | 5/2008 | Johnson | |
| 2008/0164370 | A1 | 7/2008 | Walden | |
| 2014/0339371 | A1* | 11/2014 | Yates | B64D 39/00 244/53 R |
| 2016/0031564 | A1* | 2/2016 | Yates | B64D 33/00 307/9.1 |
| 2016/0288918 | A1* | 10/2016 | Yates | B64D 39/00 |
| 2017/0137098 | A1* | 5/2017 | Valsvik | B63G 8/39 |

(Continued)

OTHER PUBLICATIONS

Bulgakov et al., Control of Hovering Altitude of a Quadrotor with Shifted Centre of Gravity for Inspection of High-rise Structures, The 31st International Symposium on Automation and Robotics in Construction and Mining, 2014.

(Continued)

*Primary Examiner* — Philip J Bonzell
(74) *Attorney, Agent, or Firm* — Van Pelt, Yi & James LLP

(57) ABSTRACT

In an embodiment, a system for battery shifting for center of gravity (CG) control includes a battery holder and a controller. The battery holder is adapted to change between a first battery position and a second battery position in a vehicle. The battery holder being in the first position causes the vehicle to have a first CG and the battery holder being in the second position causes the vehicle to have a second CG. The controller is configured to move the battery holder into the first position at least some of the time when the vehicle is flying at a first angle such that the vehicle has a CG in a first vehicle location, and move the battery holder into the second position at least some of the time when the vehicle is flying at a second angle such that the vehicle has a CG in a second vehicle location.

19 Claims, 12 Drawing Sheets

(56) References Cited

U.S. PATENT DOCUMENTS

2017/0320568 A1* 11/2017 Hohenthal ............ B64C 39/024
2018/0222560 A1*  8/2018 Postic .................. G01V 1/3808
2019/0256181 A1*  8/2019 Valsvik ................. B63G 8/001

OTHER PUBLICATIONS

Miwa et al., Attitude Control of Quad-Rotor Helicopter with COG Shift, Journal of JSEM, 2013, pp. s102-s107, vol. 13.

* cited by examiner

US 10,543,905 B1

BATTERY SHIFTING FOR CENTER OF GRAVITY CONTROL

BACKGROUND OF THE INVENTION

New types of aircraft are being developed which perform vertical takeoffs and landings but can also fly horizontally (e.g., at a constant altitude) and hover mid-air as desired. For example, some such aircraft may take off by ascending vertically, hover mid-air once the aircraft reaches a desired cruising altitude, flies in a forward flight mode where the aircraft flies at a constant altitude until it approaches a landing spot, transitions to a hover above the landing spot, and then descends vertically to land. It would be desirable if new features or improvements were made to such aircraft, for example as testing of prototypes exposed inefficiencies and/or less than optimal performance in the design of the prototypes.

BRIEF DESCRIPTION OF THE DRAWINGS

Various embodiments of the invention are disclosed in the following detailed description and the accompanying drawings.

DETAILED DESCRIPTION

Figure 1:
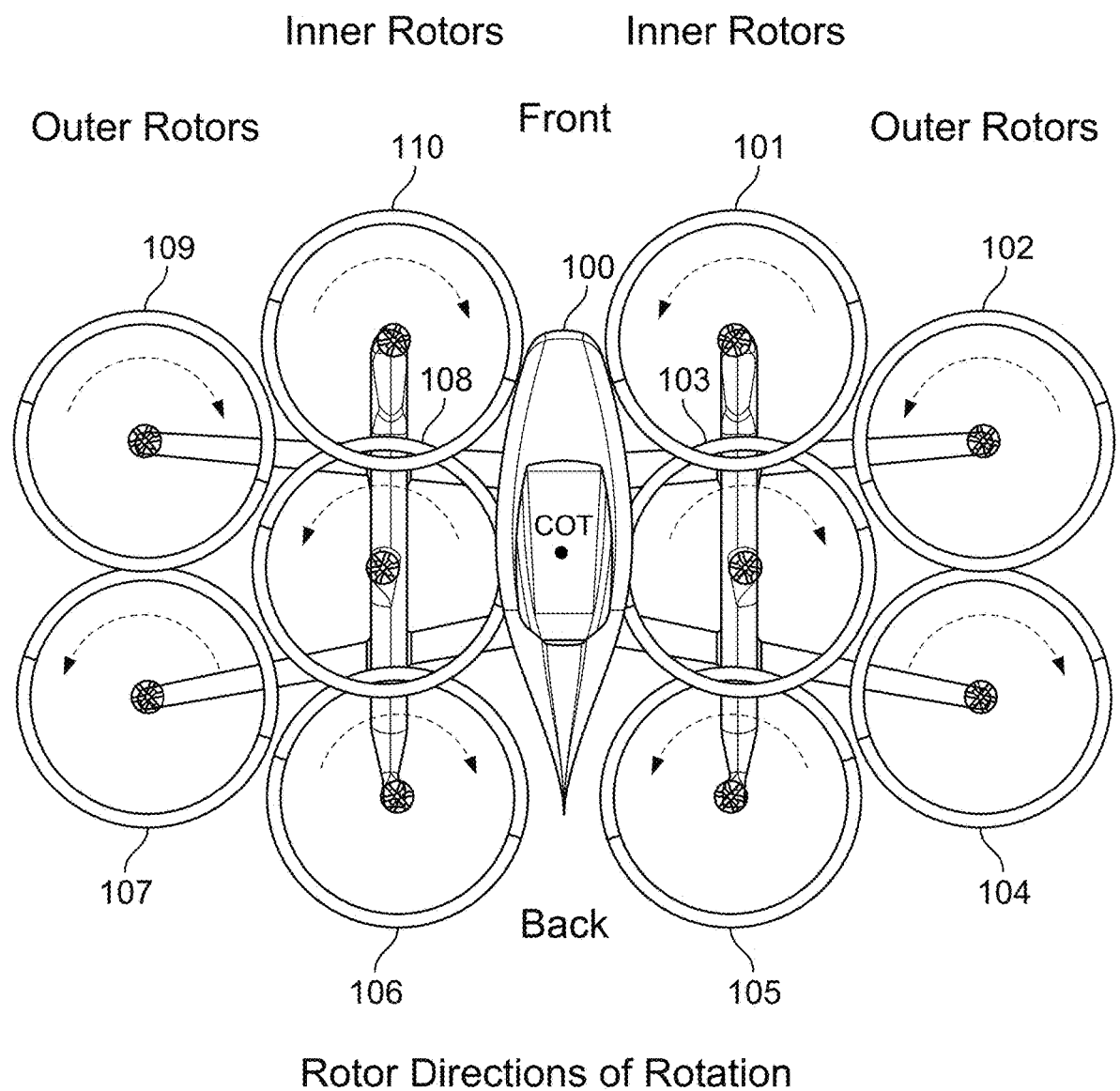
FIG. 1 is a diagram illustrating an embodiment of a multicopter in which batteries can be shifted for center of gravity control.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for shifting a battery to provide center of gravity (CG) control are disclosed. In an embodiment, a system (provided in a vehicle such as an aircraft) includes a battery (or battery holder; for simplicity battery and battery holder are used interchangeably herein) and a controller. The battery holder is adapted to hold one or more types of batteries. The battery holder is adapted to change a first battery position and a second battery position. For example, the battery holder can move between two or more positions or rotate into various positions. When the battery holder is in the first position, this causes the vehicle to have a first CG. When the battery holder is in the second position, this causes the vehicle to have a second CG. The controller is configured to move the battery holder into the first battery position when the vehicle is flying at a first angle (such as a first pitch and/or roll angle), and move the battery into the second battery position when the vehicle is flying at a second angle (such as a second pitch and/or roll angle). Before discussing the details of the battery shifting system, an example aircraft in which the battery shifting system can be provided will be discussed. The aircraft is merely exemplary and not intended to be limiting. Naturally, the battery shifting system finds application in any type of vehicle that would benefit from shifting CG to improve vehicle performance.

FIG. 1 is a diagram illustrating an embodiment of a multicopter in which batteries can be shifted for center of gravity control. The diagram shows an example of rotor directions of rotation in the multicopter. In this example, a multicopter with 10 rotors is shown with 5 rotors each on the left (port) side and right (starboard) side of the multicopter. Inner rotors 101, 103, 105, 106, 108, and 110 are located adjacent to the fuselage (100). Outer rotors 102, 104, 107, and 109 are separated from the fuselage (100) by the inner rotors. The arrangement of rotors shown here is sometimes referred to as a wide span rotor configuration. In some embodiments, the multicopter weighs 250 pounds or less. Such a multicopter may qualify as an ultralight aircraft under federal aviation regulation guidelines.

In this example, the inner rotors (101, 103, 105, 106, 108, and 110) overlap with their neighboring or adjacent inner rotor(s). For example, inner rotor 110 overlaps with (and rotates above) inner rotor 108, which in turn overlaps with (and rotates above) inner rotor 106. Similarly, on the other side, inner rotor 101 overlaps with (and rotates above) inner rotor 103, which in turn overlaps with (and rotates above) inner rotor 105. As will be described in more detail below, to achieve the overlaps shown, the rotors are tilted at various angles and/or are placed at different heights in this example.

In some embodiments, having the inner rotors overlap with each other (one example of which is shown here) is attractive because it permits a smaller, more compact footprint of the multicopter than if the inner rotors did not overlap. A smaller footprint may be desirable because the multicopter takes up less space for transport or when parked, and/or a smaller safety zone is required when taking off or landing. Also, the weight can be reduced with a smaller airframe, which is desirable since less power is required to fly the aircraft and/or the range can be extended. The tradeoff with overlapping rotors is that they may interfere with each other aerodynamically (e.g., the airflow from one rotor interferes with another rotor) but this impact may be relatively small and/or acceptable given the benefits of a smaller footprint. For example, the overlap between inner rotors shown here is relatively small and so the interference may be negligible.

In some embodiments, a multicopter is sized so that it can fit into a trailer or on a flatbed and be towed. For example, because the wingspan is wider than the nose-to-tail length of the multicopter, the exemplary multicopter may be fit into an enclosed trailer or on an open flatbed trailer sideways. By having the inner rotors overlap, this makes it easier to fit the multicopter into standard sized trailers.

Using 10 rotors as shown here may be attractive for a variety of reasons. For example, 10 rotors maximizes the multicopter's disc area within a desired overall size (e.g., the desire to fit the multicopter into or on a standard-width trailer). Using 10 rotors also helps with redundancy because it permits the multicopter to maintain flight and possibly allow for some degree of flight precision even if there is rotor failure. It is noted that a rotor failure may require power to be cut to a rotor opposite to the failed rotor for symmetry and ease of flight.

In this example, the outer rotors do not overlap with their adjacent or neighboring inner rotors. For example, outer rotor 109 (102) does not overlap with inner rotor 110 (101) nor with inner rotor 108 (103). Similarly, outer rotor 107 (104) does not overlap with inner rotor 108 (103) nor with inner rotor 106 (105). However, the outer rotors do overlap with each other (e.g., outer rotor 109 (102) overlaps with outer rotor 107 (104)). Having some separation between an outer rotor and adjacent inner rotors (i.e., no overlap) may be desirable because the outer rotors are more susceptible to larger vibrations and/or bouncing. For example, because the outer rotors are located at the distal ends of the arms which extend outward from the fuselage, the outer rotors will vibrate or bounce up and down more than the inner rotors will. The inner rotors are also mounted to the floats (e.g., which run from front to back) which further dampens any vibrations or bouncing, whereas the outer rotors are not mounted to the floats. This larger vertical displacement of the outer rotors could cause an inner rotor and outer rotor to collide which could damage the rotors. To avoid this, there is no overlap between the outer rotors and the inner rotors in this configuration. Although not shown here, in some embodiments, the two outer rotors on a given side (e.g., rotor 107 and rotor 109, or rotor 102 and rotor 104) do not overlap for this reason (e.g., to avoid a potential collision).

The position or placement of the outer rotors is selected so that the outer rotors are packed fairly efficiently and/or tightly next to the two adjacent inner rotors. For example, outer rotor 109 sits in the "V" created by inner rotor 110 and inner rotor 108. This arrangement packs the rotors in an efficient and/or tight manner which in turn reduces the footprint of the multicopter.

This diagram also illustrates the directions of rotation of the various rotors. In this example, rotors 103, 104, 106, 109, and 110 rotate in a clockwise direction when viewed from above. Rotors 101, 102, 105, 107, and 108 rotate in a counterclockwise direction when viewed from above. Or, to put it another way, rotors 101, 102, 105, 106, 109, and 110 rotate towards the fuselage and rotors 103, 104, 107, and 108 rotate away from the fuselage.

It is noted that all of the rotors in a particular column (e.g., going from the front of the multicopter to the rear of the multicopter) have alternating directions of rotation. For example, in the leftmost column shown, rotor 109 and rotor 107 have alternating directions of rotation. Similarly, in the second column from the left, rotor 110 rotates in a clockwise direction, rotor 108 rotates in a counterclockwise direction, and rotor 106 rotates in a clockwise direction. This alternation of direction of rotation may enable the multicopter to fly more efficiently. A rotor creates lift when the blade is traveling against the direction of wind and does not create lift when it spins in the direction of wind. By stacking up alternating rotors one behind the next in the direction of flight (e.g., typically forwards), the multicopter may experience a consistent amount of lift and/or decrease intervals of decreased lift.

TABLE 1

Directions of rotation for the exemplary rotors shown in FIG. 1.

| Rotor | Direction of Rotation (viewed from above) |
| --- | --- |
| Right Inner Front Rotor (101) | Counterclockwise |
| Right Outer Front Rotor (102) | Counterclockwise |
| Right Inner Middle Rotor (103) | Clockwise |
| Right Outer Back Rotor (104) | Clockwise |
| Right Inner Back Rotor (105) | Counterclockwise |
| Left Inner Back Rotor (106) | Clockwise |
| Left Outer Back Rotor (107) | Counterclockwise |
| Left Inner Middle Rotor (108) | Counterclockwise |
| Left Outer Front Rotor (109) | Clockwise |
| Left Inner Front Rotor (110) | Clockwise |

The directions of rotations shown here are selected based on a variety of factors. In some embodiments, rotors that are opposite to each other on the aircraft (e.g., where fuselage 100 acts as an axis of symmetry) may rotate in opposing directions to balance torque. For example, rotor 101 and rotor 110 are opposite to each other and rotate in opposite directions to counter the other's torque.

To illustrate the area occupied by the rotors when the rotors are on, the rotors are shown here as a circle and the number of blades is not shown. In some embodiments, a rotor has two blades and the rotors have a diameter of ~50 inches. A diameter of this size may correspond to the largest diameter possible for a 10 rotor configuration within the constraints of the desired multicopter dimensions (e.g., fit into a standard sized trailer).

It may be helpful to describe how the exemplary multicopter can be flown, beginning with how the pilot gets into the multicopter. In some cases, the multicopter will be floating on water and the pilot will get into the seat in the fuselage by walking on the arms, floats, and/or fuselage of the multicopter as needed. The rotors will be off at this time, and the pilot will be in no danger from the rotors when getting into the multicopter.

Once in the multicopter, the pilot may decide to steer (e.g., while floating on the water) the multicopter away from the boarding point to some takeoff location away from bystanders and/or other multicopters. In some embodiments, to do this, only the inner middle rotors are turned on and used to maneuver the multicopter to the desired takeoff location. For example, since rotor 103 and rotor 108 are shielded by other rotors, it will be harder for those rotors to hit any bystanders even if they are on. In some embodiments, only rotors 103 and 108 (i.e., the unexposed rotors) are used to maneuver the multicopter around to protect bystanders. Alternatively, the outer rotors (102, 104, 107, and 109) may be turned off and only the inner rotors (101, 103, 105, 106, 108, and 110) are used in some embodiments to maneuver the aircraft when on the water. Although this may pose more of a risk, it may be easier and/or more efficient to maneuver the aircraft using more rotors. In some embodiments, a multicopter has wheels and the multicopter is able to maneuver on the ground in this manner (e.g., using only shielded rotors or the inner rotors for safety).

Once the multicopter reaches the desired takeoff location, the multicopter performs a substantially vertical takeoff. Once a desired altitude is reached, the pilot may rotate (e.g., while hovering at the same altitude) the multicopter about a vertical or yaw axis (not shown here) so that the multicopter is facing or pointing in some desired direction (e.g., toward a desired destination). The multicopter then flies forward, maintaining a constant altitude until the multicopter approaches a desired landing site (e.g., over water or on land). The pilot may slow the forward movement of the multicopter, coming to a forward stop generally above the desired landing site while still hovering and maintaining a constant altitude. The multicopter then descends vertically. If needed, the pilot may stop the vertical descent and (if desired) move the multicopter laterally left or right (e.g., while maintaining a constant altitude) in order to avoid objects on the ground and/or to better align the multicopter over the desired landing site. Similarly, during the vertical landing, the pilot may stop the vertical descent and (if desired) rotate the multicopter about vertical or yaw axis so that the multicopter is facing in some desired direction and/or to make it easier to shift left or right in order to land on the desired landing site.

Figure 5:
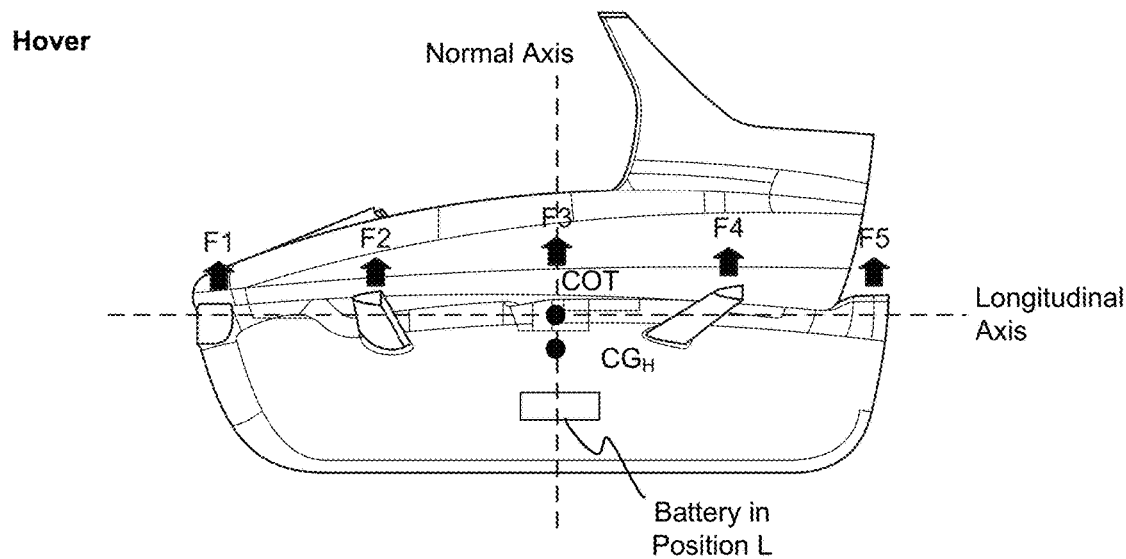
FIG. 5 is a diagram illustrating an embodiment of a battery position when a vehicle is in a hover position.
Figure 6:
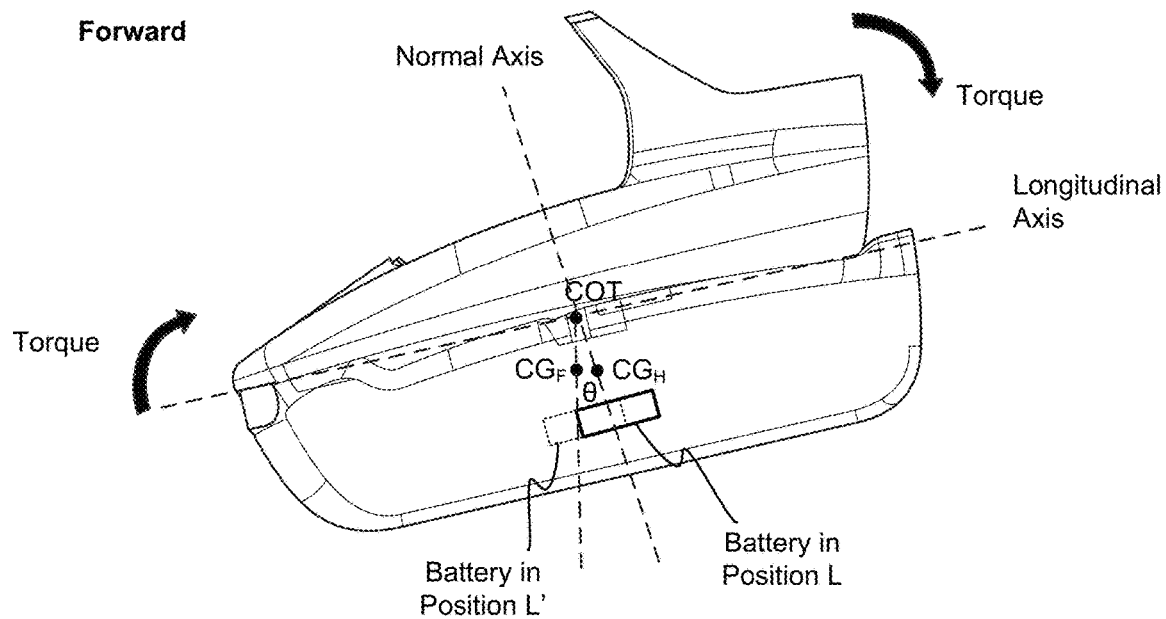
FIG. 6 is a diagram illustrating an embodiment of a battery position when a vehicle is in a forward position.

The center of thrust (COT) of a vehicle is the average location at which the total thrust is considered to apply. The COT is the midpoint where thrust from all of the vehicle's rotors balances and the direction in which the vehicle's thrust is acting. The COT of this multicopter is labelled in FIG. 1 (at the center of the fuselage which corresponds to the average location of the rotors). The center of gravity (CG) is a point from which the weight of a system may be considered to act. The CG is the average location of the weight of a system and the point around which resultant torque due to gravity forces vanishes. In an empty aircraft (one without a payload such as a pilot), the CG is the average location of the weight of the aircraft. In an occupied aircraft (one with a payload such as a pilot and/or luggage), the CG is the average location of the combined weight of the aircraft and the payload. A payload may vary for example because pilot and cargo weights vary. The techniques described here adapt to various payload weights to optimize CG of the combined aircraft and payload system. In an ultralight aircraft such as the one shown in FIG. 1, batteries contribute (sometimes significantly) to the weight of the aircraft. As further described with respect to FIGS. 4-6, batteries can be stowed in a float of the aircraft. Thus, the battery positions can affect the location of the CG. The COT and CG may be in different locations. FIGS. 5 and 6 show some examples of COT and CG locations in an example vehicle.

Each of the rotors is attached in a fixed manner to the exemplary multicopter with some fixed roll angle and fixed pitch angle. The following figure shows an example of this.

Figure 2:
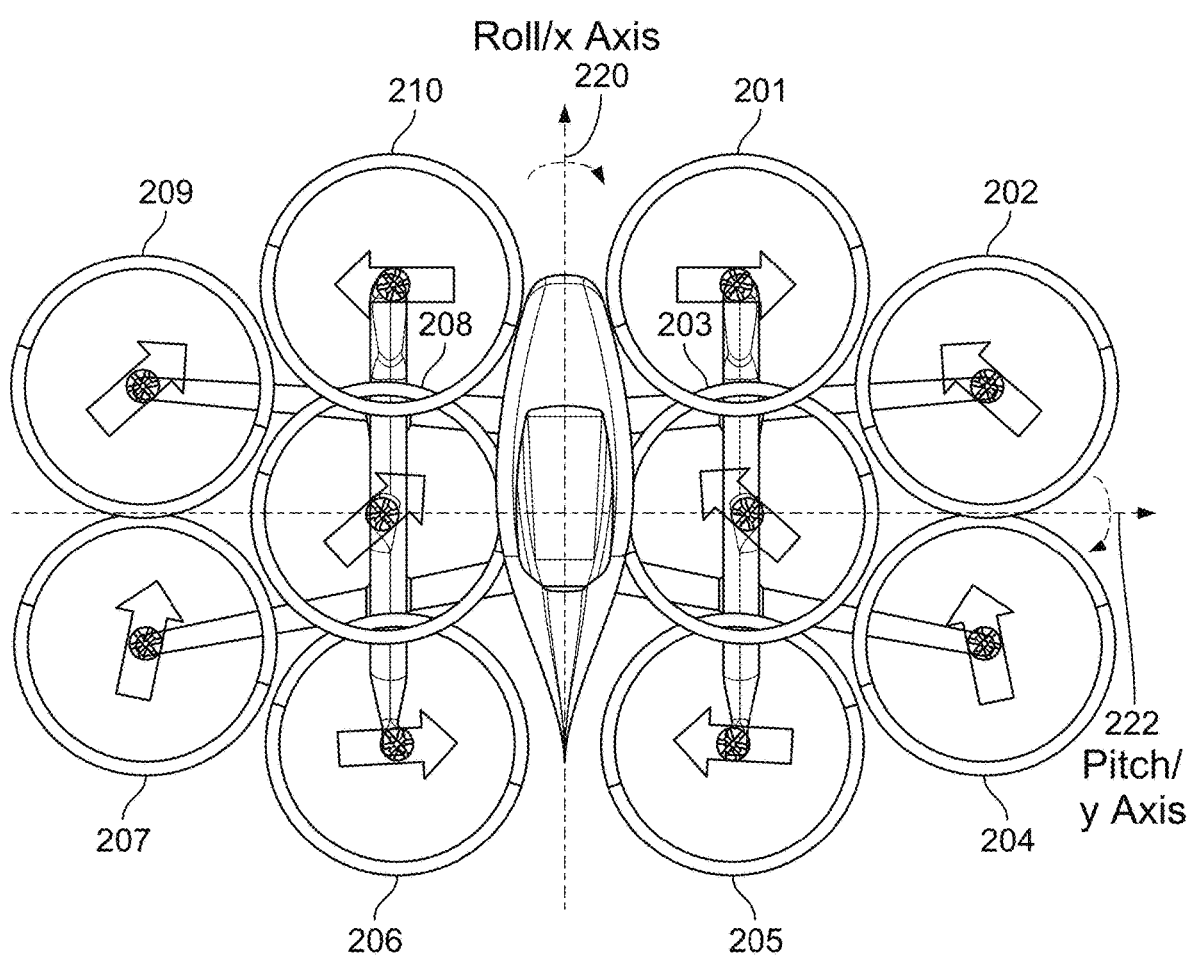
FIG. 2 is a diagram illustrating an embodiment of a multicopter in which batteries can be shifted for center of gravity control.

FIG. 2 is a diagram illustrating an embodiment of a multicopter in which batteries can be shifted for center of gravity control. The diagram shows an example of fixed tilt positions of the rotors in the multicopter. In this example, each rotor's tilt position is described using two angles: a roll angle and a pitch angle. The roll angle is defined by the roll axis (220), sometimes referred to as an x-axis, where a positive roll angle follows the right-hand direction of rotation (see, for example, the curved arrow about roll axis 220) and a negative roll angle is in the opposite direction. Similarly, the pitch angle for each rotor is defined by the pitch axis (222), sometimes referred to as a y-axis, where a positive pitch angle follows the right-hand direction of rotation (see, for example, the curved arrow about pitch axis 222) and a negative pitch angle is in the opposite direction.

The following table lists the roll angle and pitch angle for each rotor in this example. It is noted that opposite rotors (e.g., where the fuselage acts as an axis of symmetry) have roll angles of the same magnitude but opposite signs (e.g., rotor 210 has a roll angle of −3° and rotor 201 has a roll angle of 3°) and the same pitch angle (e.g., both rotor 210 and rotor 201 have pitch angles of 0°). Generally speaking, the roll angles and pitch angles have magnitudes within the range of 0 degrees and 10 degrees.

TABLE 2

Tilt positions for the exemplary rotors shown in FIG. 2.

| Rotor | Roll Angle (in degrees) | Pitch Angle (in degrees) |
|---|---|---|
| Right Inner Front Rotor (201) | 3.0 | 0.0 |
| Right Outer Front Rotor (202) | −2.0 | −3.0 |
| Right Inner Middle Rotor (203) | −4.0 | −9.0 |
| Right Outer Back Rotor (204) | −2.0 | −10.0 |
| Right Inner Back Rotor (205) | −7.0 | −2.0 |
| Left Inner Back Rotor (206) | 7.0 | −2.0 |
| Left Outer Back Rotor (207) | 2.0 | −10.0 |
| Left Inner Middle Rotor (208) | 4.0 | −9.0 |
| Left Outer Front Rotor (209) | 2.0 | −3.0 |
| Left Inner Front Rotor (210) | −3.0 | 0.0 |

For convenience, an arrow is shown over each rotor which gives a general or rough sense of each rotor's tilt position For example, if each rotor is conceptually thought of as a plane, a hypothetical ball placed on that plane would roll (e.g., generally or roughly) in the direction of the arrow shown. In general, all of the rotors are tilted slightly forward, with the inner middle rotors (203 and 208) more so.

There are a number of benefits associated with the tilt positions shown in this example. First, all of the rotors have a slight (e.g., ~5 degrees) forward bias so that when the aircraft is flying forwards, the body of the aircraft remains level. Also, the tilt positions of the rotors angles are selected to maximize the aircraft's ability to yaw while minimizing the impact of losing any single rotor. Another way to avoid losing any single rotor is to shift batteries to avoid overexerting the rotors. The more a rotor is tilted, the more it contributes to yawing the vehicle when it is sped up or down.

The rotors are mounted to the multicopter (e.g., more specifically, to the floats for the inner rotors and to the arms for the outer rotors) in a fixed manner at the roll angles and pitch angles shown in a fixed manner. In other words, the rotors cannot change their tilt positions from the positions shown. To maneuver, each rotor is independently controllable (e.g., different amounts of torque can be applied to each rotor), such that each rotor can rotate at a different speed or output a different amount of thrust.

In one aspect, the various tilt positions shown here enable the multicopter to maneuver more efficiently compared to some other multicopter designs. For example, consider another multicopter where the rotors only tilt forward or backward to some degree (i.e., all of the rotors have a roll angle of 0°). To move sideways (e.g., left or right), such a multicopter may have to expend more power because none of the rotors have a non-zero roll angle which would help to move the multicopter laterally to the left or right. In contrast, the multicopter shown here can move sideways in a more efficient manner because the rotors have non-zero roll angles. For example, to move laterally to the right, more torque would be applied to rotors 206-210, which would create a thrust differential and move the multicopter to the right. Since rotors 206-209 have positive roll angles (e.g., the tops of those rotors are tilted inward toward the fuselage), some of their overall thrust becomes lateral thrust and some becomes vertical thrust. That is, the positive roll angles of rotors 206-209 more efficiently generate lateral thrust and movement to the right compared to rotors with roll angles of 0.

In another aspect, batteries can be shifted to help the multicopter move forward, back, left or right. For example, to bank, batteries can be moved to that side of the multicopter to shift the center of gravity in a favorable direction for banking. This would allow the rotors to work less hard to achieve the same effect as an aircraft in which batteries are in a fixed location.

The following figure shows front and side views of the exemplary multicopter and discusses some landing and safety features.

Figure 3:
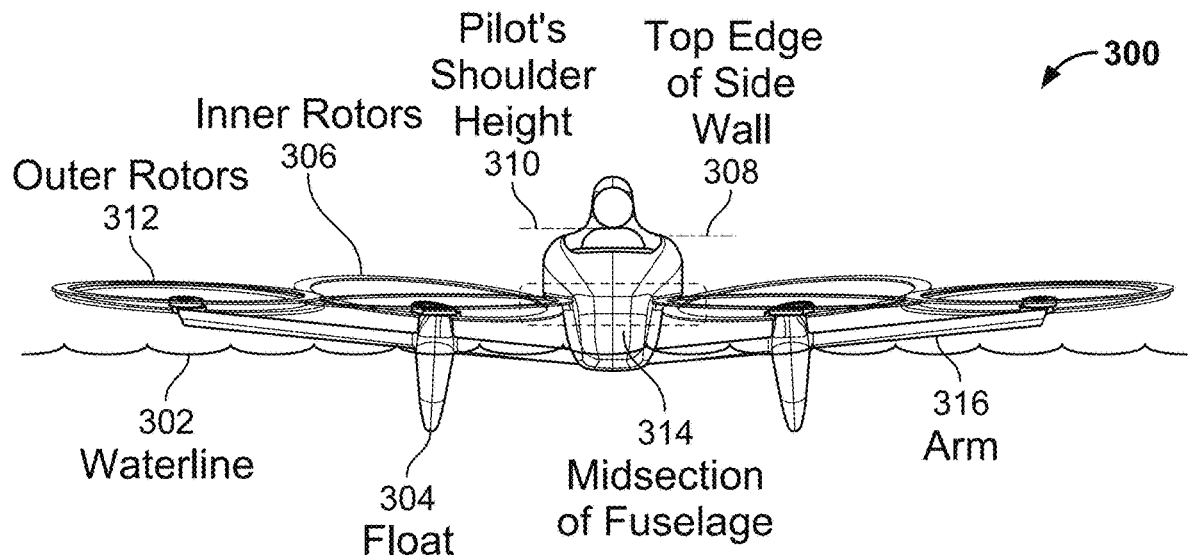
FIG. 3 is a diagram illustrating a front view and a side view of a multicopter embodiment.
Figure 3:
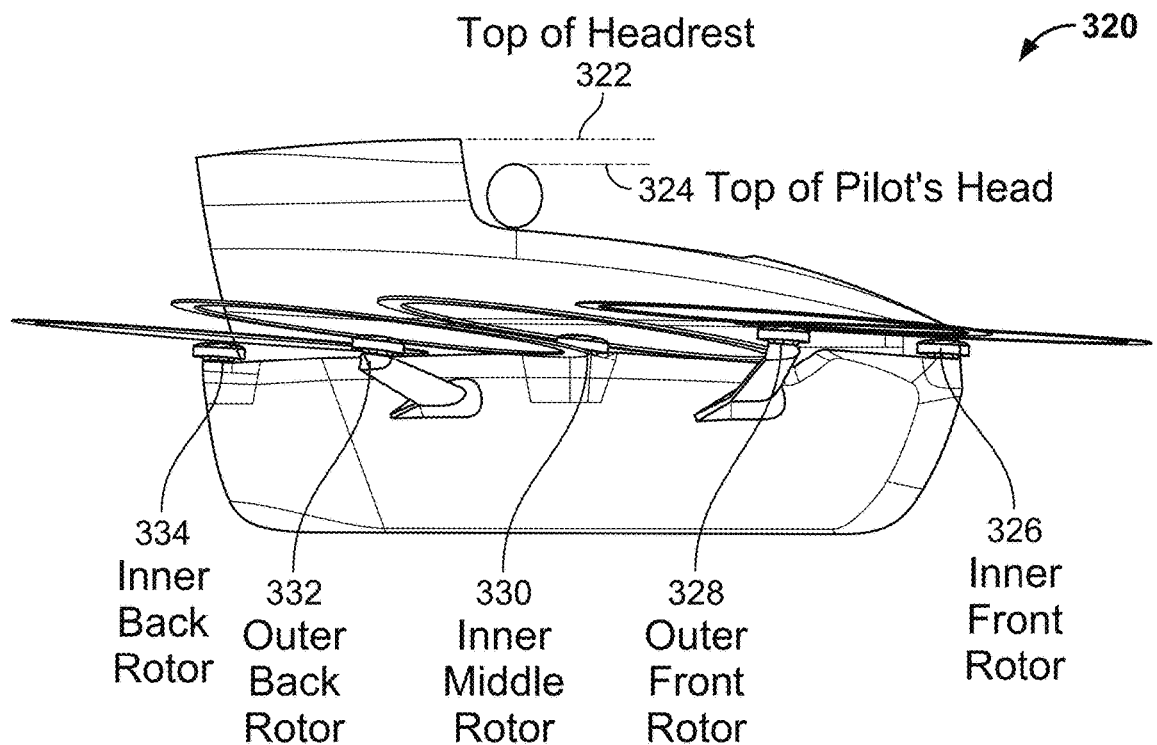

FIG. 3 is a diagram illustrating a front view and a side view of a multicopter embodiment. In the example shown, diagram 300 shows a front view of the exemplary multicopter. This multicopter is capable of taking off and landing on a variety of surfaces, including water and land (not shown here). Waterline 302 shows an example of how high the water is expected to come up to on the multicopter when the multicopter is floating on the surface of the water (e.g., with the rotors off).

From the front view shown in diagram 300, floats (304) are visible. The floats serve a number of functions or purposes. One function they serve is to displace water which generates buoyancy and enables the multicopter to float (e.g., when the rotors are off and are not providing lift). The inner rotors (306) are mounted to the top of the floats (304). Structurally, this helps to stabilize the inner rotors (e.g., since the float is more substantial than the arms to which the outer rotors (312) are attached) and reduces vibrations and/or bouncing experienced by the inner rotors. As will be described in more detail below, the floats are also used to store the batteries which power the rotors as well as actuators to move the batteries within the float.

The dimensions of the float in this example are dictated and/or set in order to satisfy various design goals and/or objectives. As diagram 300 shows, from the front view, the floats look like air foils where the floats (e.g., observed from the front) are relatively narrow. This reduces drag when the multicopter is flying forwards. Also, because the inner rotors are mounted to the floats, there is a significant amount of downdraft from the inner rotors on the floats, so the floats also act as airfoils when viewed from above. The relatively thin width of the floats minimizes the downward force on the multicopter from the inner rotors' downdraft.

The length (e.g., from front to back) of the floats is dictated by the diameter of the 3 inner rotors and the amount of overlap between the inner rotors in this example. That is, the length of the float is roughly the shortest length which can fit the 3 inner rotors with the desired amount of overlap and not substantially more than that.

Since the floats also have to displace enough water to provide sufficient buoyancy for the multicopter to float, the remaining dimension (in this case, the height of the floats) is selected to enable that. To put it another way, since drag and downdraft considerations substantially limit the width of the floats and the length of the floats is substantially dictated by the diameter and packing of the inner rotors, that only leaves the height of the rotors which can be adjusted or otherwise set to provide sufficient buoyancy. It is noted that in this example, part of the fuselage is submerged when the aircraft is floating so that the floats do not need to provide all of the necessary buoyancy for the aircraft to float; this is accounted for in the selection of the float height.

In some embodiments, the floats are filled with air (e.g., in addition to any batteries, actuators, or other components which are located in the floats) to help with buoyancy. In some embodiments, the floats have bottoms made of a thick and/or robust material so that the multicopter can be land on rough terrain or surfaces other than water. In some embodiments, the bottoms of the floats are curved. This may be desirable for water landings because it increases stability during water landings.

The front view shown in diagram 300 also illustrates a number of safety features associated with the fuselage. First, with respect to the pilot, the top edge of the fuselage's side wall (308) is at substantially the same height as the pilot's shoulder (310) when the pilot is seated. The high side walls (e.g., relative to the pilot's seated position) helps to protect the pilot's arms when the rotors of the multicopter are rotating and the pilot is seated. To touch the spinning inner rotors, the pilot's arms would have to go over the side wall, and even very long limbed people will not be able to touch the inner rotors while seated due to the tall side walls. In contrast, if the side walls were lower (e.g., at waist or stomach height), it would be easier for a pilot to reach over and touch a spinning inner rotor.

Another safety feature of the fuselage relates to the position and/or shape of the fuselage, relative to the rotors. If a rotor were to break into pieces while rotating (e.g., turning the rotor pieces into projectiles), the projectiles can actually project at a non-zero angle, causing the debris to leave the plane of rotation. In this example, the side wall's height is selected to accommodate for this, for example based on testing to determine a range of angles (e.g., from the plane of rotation) any projectiles are likely to be projected at if a rotor were damaged. For example, based on testing and/or simulation, heavier and faster moving particles do not tend to go more than ±5 degrees from the plane of rotation when they break apart. This means that the exposed part of the pilot (e.g., above the top edge of the side walls) should not be near the rotors' plane(s) of rotation plus some angle of projection. For this reason, a tall side wall is again useful.

The fuselage is also elevated relative to the rotors to further separate the top edge of the side wall (308) from the plane(s) in which the rotors rotate. With the multicopter configuration shown here, a rotor projectile would hit the fuselage near the midsection of the fuselage (314), not near the top edge of the side wall (308) where the pilot is exposed. In some embodiments, the midsection of the fuselage (e.g., where a projectile from a broken rotor might hit) is reinforced or otherwise designed to protect the pilot should a blade or rotor strike the fuselage.

Returning briefly to the tilt positions shown in Table 2, at least some of the rotors are also tilted in a way that reduces the likelihood of a pilot getting struck by a broken rotor. Note that almost all of the rotors (e.g., except for rotors 201 and 210) have roll angle signs (e.g., positive or negative) which mean that the rotors are mounted such that the top of each rotor tilts inward toward the fuselage. Returning to diagram 300 in FIG. 3, this means a rotor projectile rotor would go downward (e.g., away from the pilot) as opposed to upward (e.g., toward the pilot). Thus, the tilt positions of at least some of the rotors also help to protect the pilot.

Returning to diagram 320 in FIG. 3, the elevated position of the fuselage (e.g., where the bottom of the fuselage is connected to the arms (316) of the multicopter) may also be desirable because of the separation between the bottom of the fuselage and the ground. This separation between the fuselage and the ground permits the multicopter to land on uneven and/or rocky ground where a rock or protrusion might otherwise damage a lower-hanging fuselage.

At the midsection (314), the fuselage narrows inward (e.g., the side wall includes a top panel which runs vertically, a middle panel which runs (e.g., inwards) horizontally, and a bottom panel which runs vertically) so that the bottom portion of the fuselage is narrower than the top portion of the fuselage. The wider top enables the pilot to more easily enter and exit the multicopter and more comfortably sit in the multicopter. For example, although not shown here, the inside of the fuselage may have arm rests. These arm rests may be located above and/or formed by the narrowing of the fuselage at the midsection (314).

The narrower bottom of the fuselage permits the inner rotors to be closer to the center of the multicopter, which reduces the span (width) of the multicopter. Note, for example, that the narrowing of the fuselage at the midsection (314) creates an overhang beneath which the tips of the inner rotors (306) spin. This permits the rotors to be squeezed in more tightly and for the span (width) of the multicopter to be smaller than if the fuselage were the same width from top to bottom. The narrowing shape also has weight advantages.

Although not shown here, in some embodiments, the seat of a multicopter includes a seatbelt for strapping in a pilot (e.g., in a recumbent and/or seated position). When the rotors are spinning, the seatbelt may help to prevent the pilot from touching the spinning rotors. Also, during a crash or rollover, a seatbelt may keep the pilot safer.

Diagram 320 shows a side view of the multicopter. As shown here, the top of the headrest (322) is higher than the top of the pilot's head (324) when the pilot is seated. The headrest is protective and reinforced so that if the multicopter flips and/or rolls, the headrest protects the pilot's head from being crushed. In some embodiments, the headrest is reinforced by being part of a roll cage or other protective frame which extends throughout the fuselage to prevent the fuselage from collapsing inward and crushing additional body parts, such as the pilot's arms, torso, and legs.

The side view shown in diagram 320 also illustrates the different rotor heights (which generally speaking are within the range of 45 cm-55 cm off the ground) which help to achieve (e.g., in combination with the various tilt positions of the rotors) the rotor overlaps shown in FIG. 1 and FIG. 2.

TABLE 3

Relative heights of the exemplary rotors shown in FIG. 3.

| Rotor | Height |
| --- | --- |
| Inner Front Rotor (326) | 48 cm |
| Outer Front Rotor (328) | 52 cm |
| Inner Middle Rotor (330) | 48 cm |
| Outer Back Rotor (332) | 53 cm |
| Inner Back Rotor (334) | 50 cm |

To address height differences in pilots, a variety of techniques may be used. In some embodiments, the seat is adjustable so that is can be raised or lowered depending upon the pilot's height. For example, a shorter pilot may not be able to see over the side wall or front wall and an adjustable seat would be raised. Conversely, an adjustable seat may be lowered for a taller pilot so that a taller pilot's head remains below the top of the headrest and/or their shoulder is substantially the same height as the top edge of the side wall. Other techniques, including booster seats for shorter pilots or swappable/removable seats, may also be employed.

The multicopter shown here is merely exemplary and is not intended to be limiting. For example, this multicopter does not have a windshield but other embodiments may include a windshield for comfort and/or protection. In some embodiments, the windshield is also used as a heads up display. In some embodiments, the cockpit is enclosed so that the pilot is protected from all sides or angles.

Batteries can be shifted inside the aircraft to improve aircraft performance such as enhancing balance and increasing efficiency. The following figure shows examples battery positions in various aircraft positions.

Figure 4:
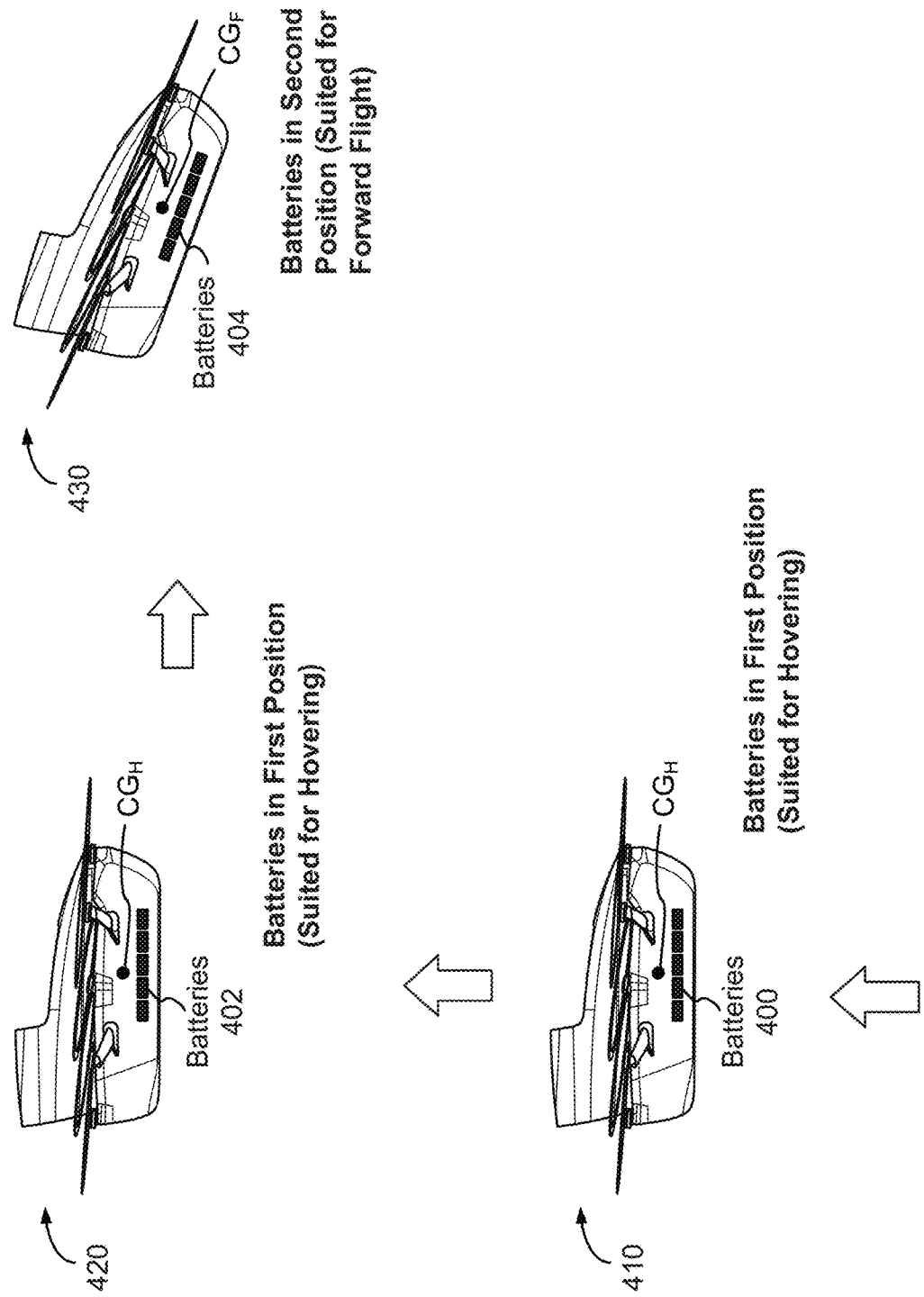
FIG. 4 is a diagram illustrating an embodiment of battery positions in various aircraft operating positions.

FIG. 4 is a diagram illustrating an embodiment of battery positions in various aircraft operating positions. The diagram shows an example of a flight path in a takeoff sequence, which includes hovering and forward flight. In this example flight, the multicopter takes off vertically and ascends vertically. Multicopter 410 shows the exemplary aircraft while it is performing a vertical takeoff. In this state shown here, the batteries 400 are in the position shown (e.g., around the center of the float). Consequently, the center of gravity is at location CGH. The multicopter continues to ascend vertically with its longitudinal axis substantially parallel with the ground (or, in some embodiments, slightly tiled back) to reach an altitude suitable for cruising. Multicopter 420 shows the exemplary aircraft near the end of vertical takeoff. The batteries 402 are in the position shown, which corresponds to the center of gravity being at location CGH (which is the same as in multicopter 410). As the multicopter gets closer to some desired cruising altitude, the multicopter slows its vertical ascent until it comes to a stop, hovering mid-air (420). The batteries 404 are now in the position shown, which corresponds to location $CG_F$. CGH is the suited for hovering, while $CG_F$ is suited for forward flight.

The multicopter then transitions from an entirely upward direction of movement to a direction of movement with at least some forward motion when the multicopter reaches some desired altitude at which to begin the transition (420). In one example, the altitude at which the multicopter begins the change from hover position to cruise (forward) position is an altitude which is sufficiently high enough for there to be recovery time in case something goes wrong during the transition. From the hovering position (420), the multicopter transitions from hovering mode or style of flight to a flying forward mode or style of flight (e.g., where the multicopter flies within some 2D plane at a relatively constant altitude). From position 420, the multicopter flies substantially forward. Once in the cruise/forward position 430, the fuselage of the aircraft is oriented with its nose slightly closer to the ground than its tail as shown.

In a conventional battery setup in which the battery is fixed (and thus the center of gravity is fixed), the aircraft will tend to pitch forward more due to the (fixed) center of gravity, which is forward of center. This could lead to imbalance, which is compensated for by spinning the forward rotors faster than would otherwise be required (e.g., with a more optimized and/or adjustable center of gravity). Another way to improve balance while not needing to drive the forward rotors too hard is to shift the battery position to obtain a more desirable center of gravity (here, farther back than the position shown). By changing battery position(s) in order to change the center of gravity, it may be possible to reduce power consumption and thus increase flight time. To put it another way, with an adjustable center of gravity, the multicopter will not have to work as hard to counter a more imbalanced center of gravity. Battery shifting techniques and the corresponding performance improvement are further described below.

Although not shown, once the multicopter gets close to some desired destination, the multicopter comes to a forward stop and hovers in the air (e.g., similar to position 420), then descends vertically to perform a vertical landing and lands on the ground (the reverse of the path described earlier).

FIG. 5 is a diagram illustrating an embodiment of a battery position when a vehicle is in a hover position. The vehicle shown here is the same as the one in FIGS. 1-4 although some components (such as the rotors and arms) have been removed to more clearly illustrate the batteries. Some of the rotors may be provided at the ends of arms (booms) extending outward from the fuselage (e.g., the rotors corresponding to F2 and F4). The rotors generate thrust as indicated by the upward forces. Referring also to FIG. 1, F1 corresponds to rotor 110, F2 corresponds to rotor 109, F3 corresponds to rotor 108, F4 corresponds to rotor 107, and F5 corresponds to rotor 106. Thus, the center of thrust (COT), which is the average location of the total thrust, is substantially at the center of the vehicle as shown. One or more batteries are provided in the float 504, which is like the float 304 of FIG. 3. The batteries may be supported by a platform (not shown) inside the float. The batteries are free to move inside the float such as along the platform (e.g., under the control of a controller and/or if any locks are unlocked, etc.). Example mechanisms that control movement of the batteries are further described in FIGS. 8A-15. For example, the batteries can be configured to move in response to changing pitch of the vehicle.

As described above, the hover position may correspond to take-off or landing of a multicopter, among other things. In the hover position, the vehicle is substantially level (or slightly pitched back at about 5 degrees so that the nose of the vehicle is farther from the ground than the tail of the vehicle) meaning that the longitudinal axis of the vehicle is substantially parallel with the ground as shown. In this example, the battery is installed in the position L shown, which means that the COT and center of gravity (CGH) are aligned along the normal axis.

In a vehicle without a system for shifting batteries for center of gravity control, batteries are typically installed in a fixed location. The location may be selected to be optimal for one flight position such as hover position. When the vehicle switches to other flight positions (such as forward flight position), the battery remains in the fixed location. This may be sub-optimal because some of the rotors work harder to compensate for the torque generated by a non-aligned COT and center of gravity. That is, the aircraft may tend to become unbalanced, and the aircraft attempts to maintain balance by spinning some of the rotors faster to generate more thrust than other ones of the rotors. For example, during testing of earlier multicopter prototypes with fixed battery positions or locations, it was observed that the speed controllers for the two inner front rotors would occasionally overheat because they were working hard to compensate for the fixed and less than optimal center of gravity. For safety reasons, the multicopter would (prematurely) land due to the overheated speed controller even if the battery had sufficient power to fly longer.

In a vehicle with a system for shifting batteries for center of gravity control, the battery in position L may be moved to other positions to help improve balance (e.g., of the CG relative to the COT), reduce the load on the rotors, or even improve efficiency by exaggerating the effect of thrust produced by one or more of the rotors. This can, for example, avoid premature landings due to overheated rotor controllers (or at least delay this event) and/or conserve power because the two inner front rotors don't have to work as hard as with a fixed CG. The following figure shows several positions that the battery can be moved into. For example, to maintain COT and center of gravity alignment (so that there is less imbalance and the rotors don't have to work as hard), batteries may be shifted from position L to position L'.

FIG. 6 is a diagram illustrating an embodiment of a battery position when a vehicle is in a forward position. As described above, the forward position may correspond to forward flight of a multicopter (e.g., when the multicopter flies within a 2D plane at a constant altitude), among other things. In the forward position, the vehicle is slightly pitched forward as shown where the nose of the vehicle is closer to the ground than the tail of the vehicle. If a system does not have battery shifting, the battery will be in the same position L as in the vehicle hover position (FIG. 5). Because the vehicle is pitched forward, the battery being in position L will cause the center of gravity to be in CGH and thus the COT and center of gravity are not aligned on the normal axis. The misalignment of the COT and center of gravity causes torque in the direction of the arrows, which causes the vehicle to tilt forward farther. A flight controller may attempt to maintain balance by instructing the front rotors (and in particular the inner front rotors) to spin faster and generate more thrust than the back rotors. This causes the (inner) front rotors to take on a greater load, use more energy, and may stress an electronic speed control to overheat and possibly fail.

The battery can be shifted according to the techniques described below to improve stability and reduce load on the rotors. Reducing the load reduces the spinning of the rotor and reduces heat and potential of malfunction. For example, moving the batteries to the left would cause the center of gravity to shift to position $CG_F$, which is suited for forward flight. $CG_F$ is better suited for forward flight than $CG_H$, because it improves stability of the vehicle by decreasing torque in the direction of the arrows. The difference in position between $CG_F$ and $CG_H$ is angle θ. The greater the value of angle θ, the more torque generated and greater the imbalance. Position L' can be determined to minimize the value of θ.

Figure 7:
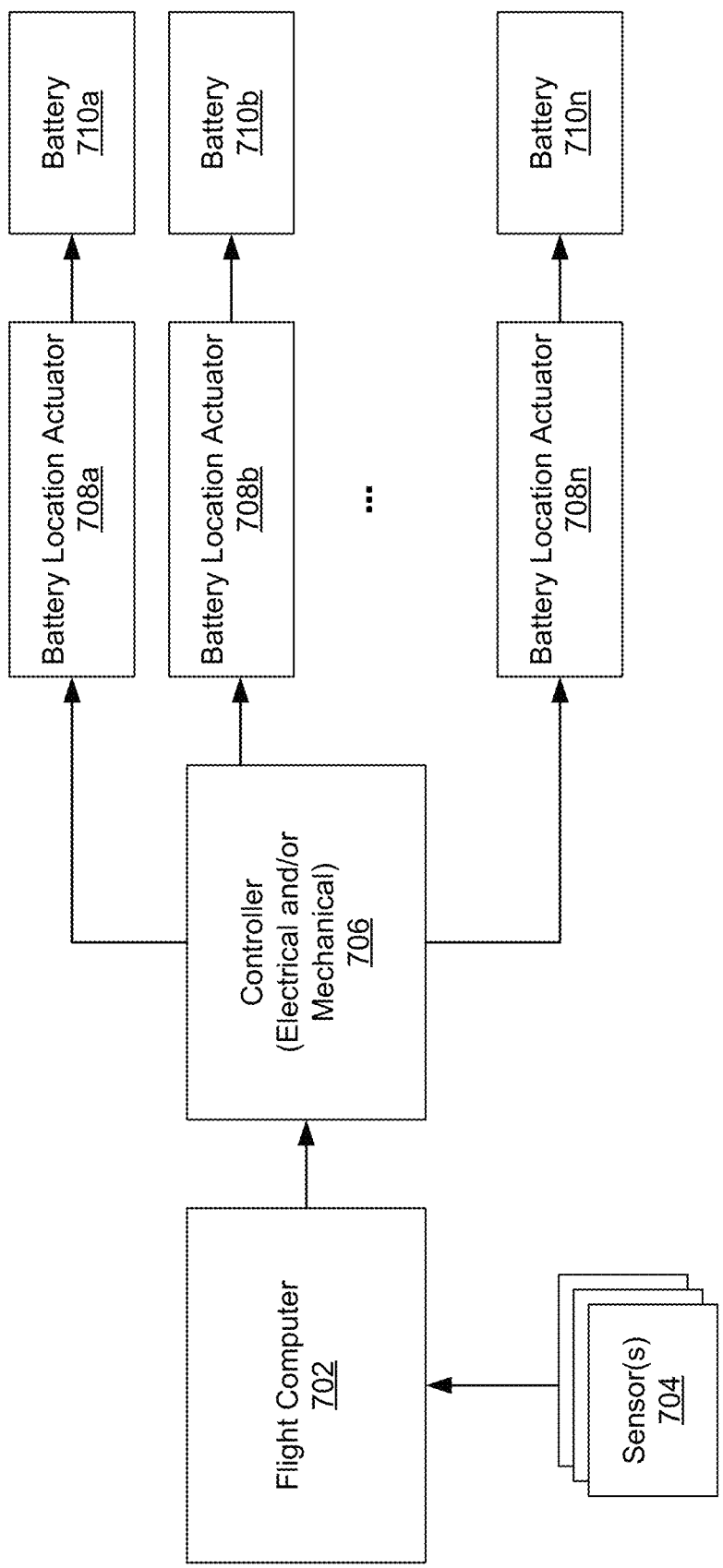
FIG. 7 is a block diagram illustrating an embodiment of a system for shifting batteries for center of gravity control.

By shifting the batteries, the center of gravity can be shifted to self-correct for optimal performance (e.g., maximizing efficient use of the motor, extending battery life, etc.). The battery positions selected for optimizing various parameters may be different. That is, a first set of positions may be preferred to extend battery life while a second set of positions may be preferred to optimize motor performance. The battery positions may be calculated by a flight computer from sensor readings (current flight altitude, pitch, roll, and/or yaw angle of the aircraft, etc.). First, an example control path for determining battery positions, sending instructions about the positions to a controller, and actuating vehicle equipment to carry out the instructions to bring the batteries to the desired position will be described (FIG. 7). Then, example actuators and tracks for shifting the batteries will be describes (FIGS. 8A-15).

The number of batteries shown in FIGS. 5 and 6 is exemplary and not intended to be limiting. For example, any number of batteries may be provided. An occupant is not shown in the examples of FIGS. 5 and 6. The vehicle can accommodate a payload such as an occupant and/or luggage. The center of gravity would vary with the weight of the payload, but the principles described herein apply for the case of an occupied vehicle. For example, the center of gravity would be given by the combined weight of the vehicle and its payload (rather than the vehicle alone in the above examples). The technique described herein can shift batteries in response to measured center of gravity in real-time or near real-time.

FIG. 7 is a block diagram illustrating an embodiment of a system for shifting batteries for center of gravity control. The system includes flight computer 702, one or more sensors 704, controller 706, one or more battery location actuators 708a-708n, and one or more batteries 710a-710n. The flight computer is configured to calculate a flight path and implement the flight path by instructing aircraft components such as rotors to spin at a certain speed, batteries to be shifted to a certain position, and safety measures to be carried out. The flight computer can work alone (e.g., autonomous flight such as when performing safety checks) or in connection with a pilot. A pilot's commands such as increasing throttle can be translated by the flight computer into specific instructions for aircraft parts. The flight computer may receive readings from sensors, use the readings to make calculations, and actuate aircraft parts. For example, stability or efficiency can be enhances by shifting batteries to obtain a desired CG position.

The sensor(s) 704 monitor aircraft performance. For example inclinometers measure angles/tilt or elevation, transducers measure weight, motors report back on motor performance and status such as temperature, and the like. The sensors report various parameters to the flight computer 702, and the flight computer uses this information to calculate a center of gravity. For example, in the situation shown in FIG. 6, the flight computer determines that aircraft stability can be improved by shifting the $CG_H$ left to position $CG_F$. The flight computer provides the desired CG to controller 706.

Controller 706 is adapted to send control signals to various aircraft components to effect changes in the aircraft (or maintain stability). The controller can be electrical (sending electrical signals to actuators as in a fly-by-wire system), mechanical, or a combination. The controller sends a signal to actuators 708a-708n to instruct the actuator or control surface to behave a certain way. For example, the controller implements the CG provided by the flight computer by translating CG to battery position(s), and instructing actuator(s) to the batteries to the desired position. In a system with individual actuators for each battery, the controller instructs each actuator to shift its respect battery. In a system with an actuator for more than one battery, the controller instructs the actuator to shift the batteries for which it is responsible to the desired position.

The battery location actuator(s) 708a-708n each moves an associated battery 710a-710n to a position dictated by controller 706. For example, a motorized mechanism provides positional transition based on avionic control feedback (e.g., from a flight computer) for a desired CG position. A battery location actuator can be implemented by a variety of devices including a belt and pulley, lead screw, rack and pinion, linear actuator, etc. As described above, a system may have one or more battery location actuators. In some embodiments such as the one shown, there is a one-to-one mapping of actuator to battery such that each battery has its respective actuator (e.g., FIG. 13A). In some embodiments, an actuator is responsible for more than one battery and can move them along a track (e.g., FIG. 8A).

In one aspect, the position of the batteries can help to optimize motor performance, battery life, etc. In another aspect, the position of the batteries can aid in flight controls (such as pitch, yaw, roll, etc.) by shifting the batteries to desired positions and allowing controls to produce counter torques in the desired direction.

In various embodiments, batteries are positioned differently at different phases of flight. For example, batteries can be positioned/angled in a first position when the aircraft is in hover position (e.g., 410 and 420 of FIG. 4 and FIG. 5) and positioned/angled in a second position when the aircraft is in a cruise position (e.g., 430 of FIG. 4 and FIG. 6). The first position is optimized for hovering while the second position is optimized for cruising. For example, the flight computer instructs actuators to shift batteries when the vehicle reaches different positions. In various embodiments, a locking mechanism keeps the batteries in position during hover, unlocks to allow the batteries to reposition into a different position for cruise, and locks to keep them there.

Figure 8A:
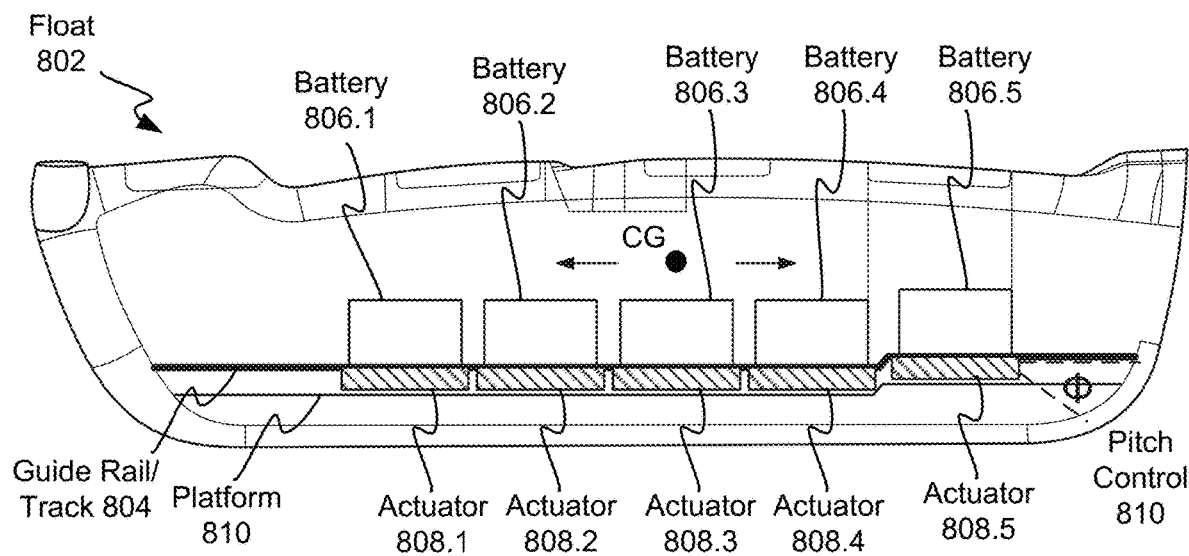
FIG. 8A is a diagram illustrating an embodiment of a system for shifting batteries for center of gravity control from a side view.
Figure 11A:
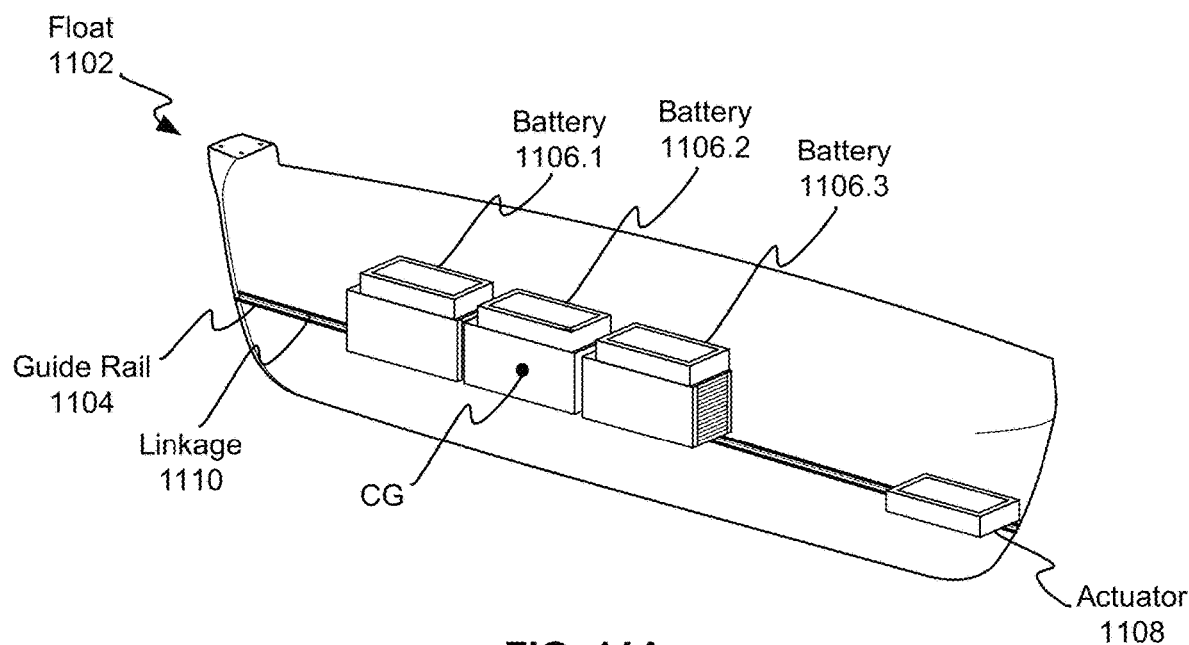
FIG. 11A is a diagram of a system for shifting batteries for center of gravity control in a first state.

FIG. 8A is a diagram illustrating an embodiment of a system for shifting batteries for center of gravity control from a side view. This figure shows an example of a float 802 containing five batteries 806.1-806.5. The fuselage is not shown here to more clearly illustrate the battery shifting system inside the float. The float can be part of another vehicle such as the ones shown in FIGS. 1-6. Each of the batteries 806.1-806.5 has a corresponding actuator 808.1-808.5 (a battery will be generally referred to as battery 806 and an actuator will be generally referred to as actuator 808). Battery 806 is provided on guide rail 804 (sometimes called a track), which is turn provided on a platform 810. The platform can be made of a lightweight rigid material capable of supporting the batteries such as carbon fiber. The center of gravity (CG) can be shifted left or right in the direction of the arrows by sliding one or more of the batteries 806.1-806.5 along the guide rail 804. FIGS. 11A-12 show more detailed examples of the guide rail.

Battery 806 can be any type of battery suitable for ultra-lightweight or vertical take-off and landing (VTOL) aircraft. For example, a battery can be on the order of 11 pounds and measuring around 8.5 inches×3.4 inches×5 inches. The battery can be packaged to slide/move along a guide rail or platform. In this example, each battery has a respective actuator to facilitate movement of the battery along the guide rail. In other embodiments, there are fewer actuators than the number of batteries such as one actuator for every two batteries. The number of batteries shown in this example is merely exemplary and not intended to be limiting. Fewer or more batteries can be provided, for example depending on the number of rotors or energy needs of the vehicle.

The guide rail 804 is adapted to guide movements of battery 806 within the float 802. For example, actuator 808 propels or translates battery 806 along the guide rail. In this example, the guide rail is substantially parallel to the bottom of the float. In some embodiments, the guide rail is on a plane not parallel to the bottom of the float. In some embodiments, the guide rail is entirely on a single plane while in other embodiments parts of the guide rail are on different planes such as the portion under battery 806.5 shown in this example. The shape of the guide rail can be made to accommodate other components in the float such as electronics. In some embodiments, a single guide rail corresponds to all of the batteries, while in other embodiments each battery or group of batteries has its own separate guide rail. Although separate tracks may be more complex to implement and/or heavier, separate tracks may be desirable because they provide multi planar/axis weight distribution in the case of center of gravity imbalances not only in the nose to tail but also from port to starboard.

The guide rail can also be structured to provide control of pitch 810. For example, angling certain sections of the guide rail can help to move the CG to control pitch of the vehicle while using less energy.

Figure 8B:
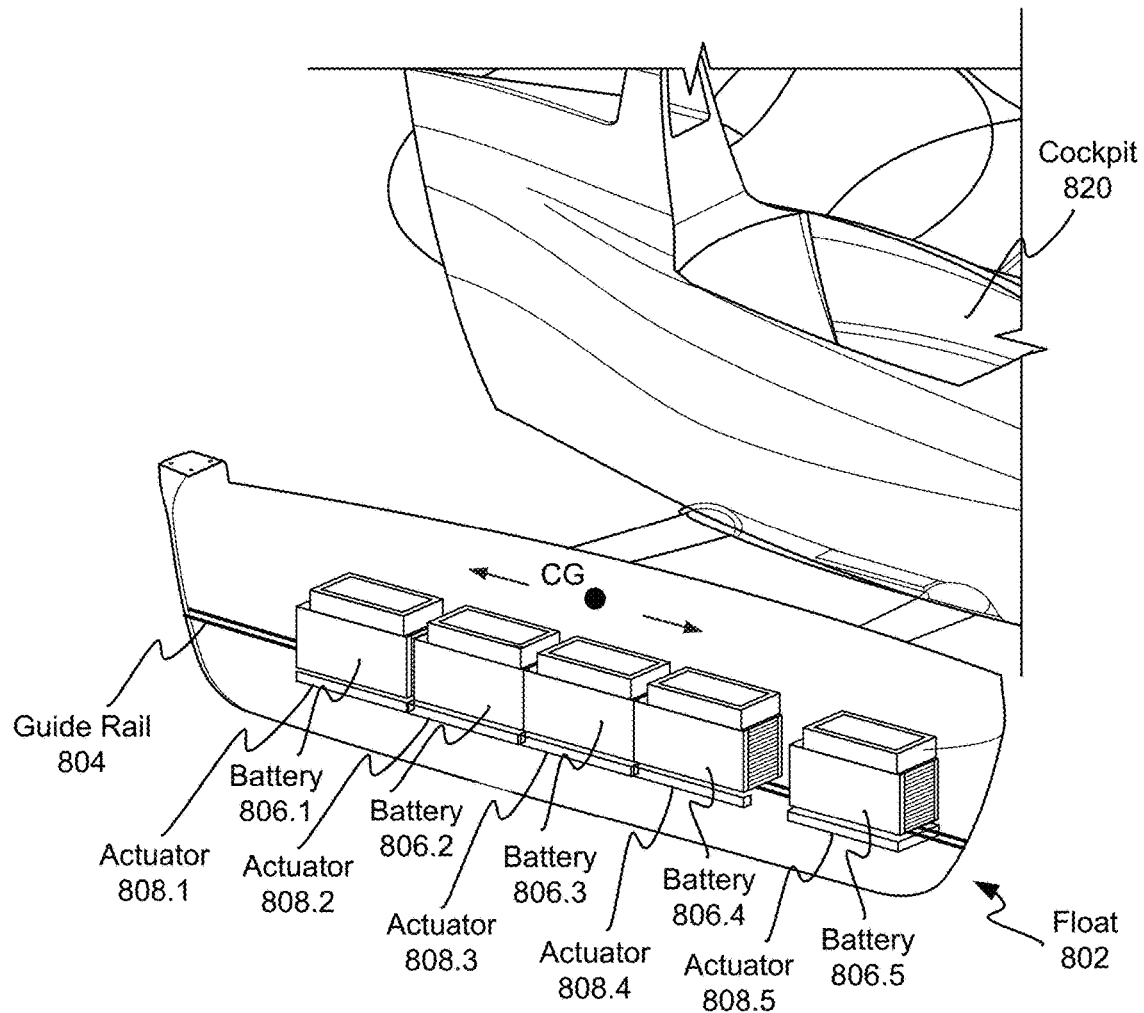
FIG. 8B is a diagram illustrating an embodiment of a system for shifting batteries for center of gravity control from a perspective view.

FIG. 8B is a diagram illustrating an embodiment of a system for shifting batteries for center of gravity control from a perspective view. The perspective view here corresponds to the one shown in FIG. 8A. Rotors, which are located as the end of booms are not shown for clarity, and a cockpit portion of the fuselage is shown to provide context for the float. The float includes a guide rail 804, batteries 806.1-806.5, and actuators 808.1-808.5. Each of these components are like their counterparts described in FIG. 8A. Battery 806 is adapted to slide along the guide rail to change the CG of the vehicle. The batteries can be shifted in a manner to continuously change the CG in the direction of the arrows or, alternatively, to discretely (e.g., step-wise) change the CG. The following figures show some examples of a continuous versus discrete CG change.

Figure 9:
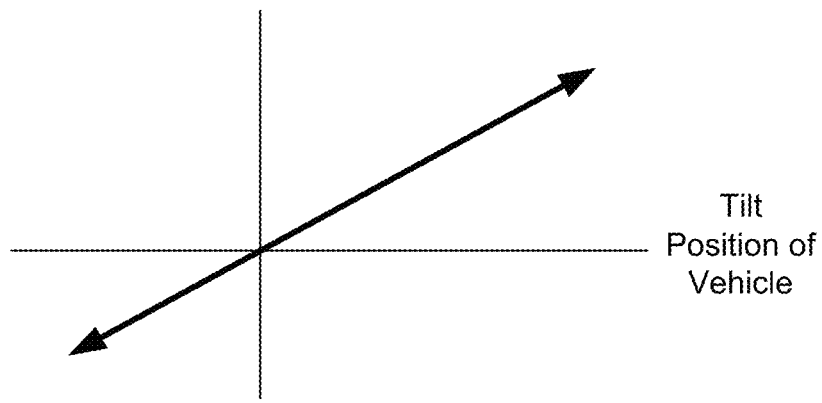
FIG. 9 illustrates an example of continuously changing battery position obtained in some embodiments.

FIG. 9 illustrates an example of continuously changing battery position obtained in some embodiments. The CG changes with tilt of the vehicle. The x-axis is the tilt position of the vehicle. The left-hand (more negative) side is when the vehicle is tilted towards the port side while the right-hand side is when the vehicle is tilted towards the starboard side. They-axis is the center of gravity of the vehicle. The bottom (more negative) side is towards the nose of the aircraft while the top is towards the tail of the aircraft. The slope can be changed to achieve the desired change in CG relative to tilt of the vehicle by designing the battery shifting system to be more or less responsive to tilt.

Figure 11B:
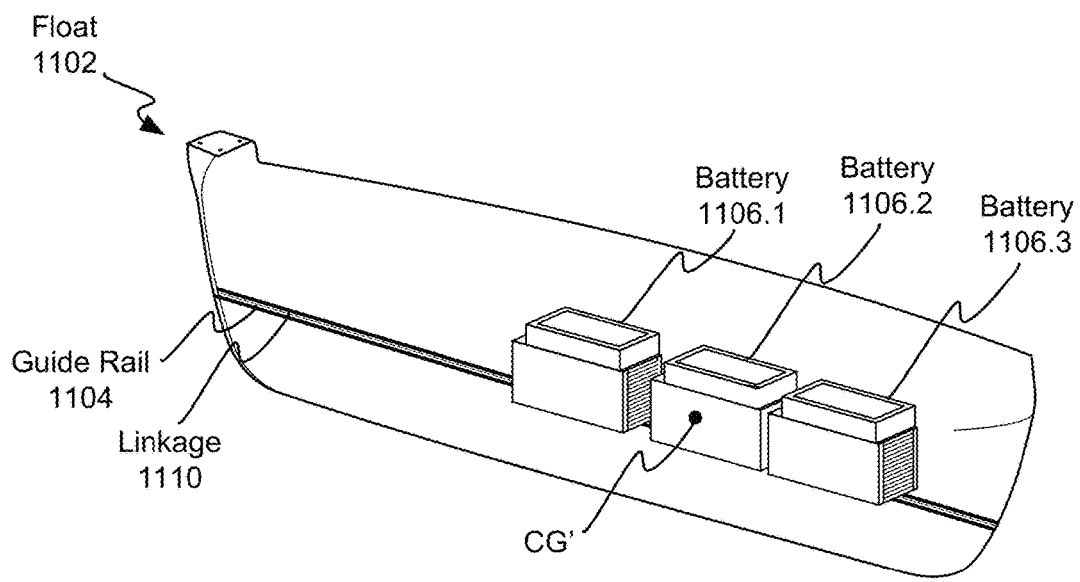
FIG. 11B is a diagram of a system for shifting batteries for center of gravity control in a second state.
Figure 12:
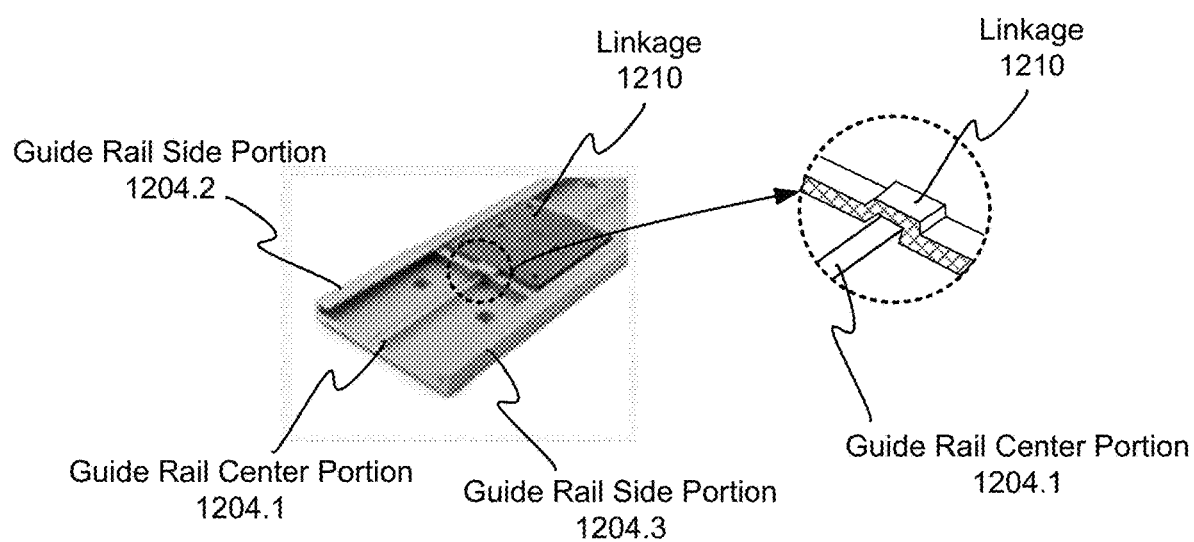
FIG. 12 is a diagram of a guide rail and linkage for shifting batteries for center of gravity control.

Referring to FIGS. 11A and 11B, the batteries can be shifted along guide rail 1104 to gradually shift the center of gravity from CG to CG'. In this example, the CG continuously varies with the tilt position. Alternatively, the CG can be varied discretely as shown in the following figure.

Figure 10:
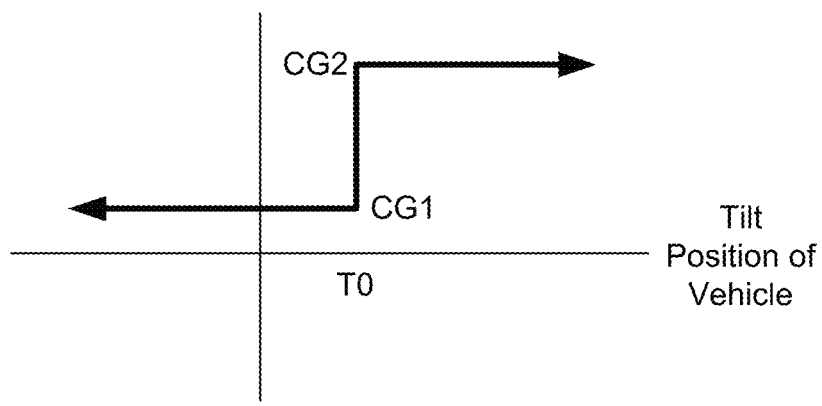
FIG. 10 illustrates an example of discretely changing battery position obtained in some embodiments.

FIG. 10 illustrates an example of discretely changing battery position obtained in some embodiments. The x-axis and y-axis are like those described for FIG. 9. The CG remains at position CG1 until the vehicle reaches a tilt threshold TO. At and beyond tilt position TO, the CG is moved to position CG2 by shifting the batteries. Locks can be provided in the guide rail to enable the batteries to snap into certain positions (here, CG1 and CG2). Referring to FIGS. 11A and 11B, the batteries can be shifted along guide rail 1104 to shift the center of gravity from CG to CG' without stopping at any other intermediate CGs.

The curves shown in FIGS. 9 and 10 are exemplary and not intended to be limiting. For example, other CGs can be CGs that vary with two different slopes depending on range of tilt, discretely change to more than the two positions shown in FIG. 10, etc.

A variety of actuators and guide rails can be used to shift the batteries. The following figures show some examples of actuators and battery groupings.

FIG. 11A is a diagram of a system for shifting batteries for center of gravity control in a first state. In this example, the system is provided inside a float 1102 of an aircraft. An example of a float is described above (e.g., FIG. 3). Here, an actuator 1108 is configured to shift batteries 1106.1, 1106.2, and 1106.3 along guide rail 1104 using a linkage 1110. Each of the batteries have the same characteristics as those described above (e.g., in FIGS. 8A and 8B).

Guide rail 1104 is configured to define a range of movement of batteries such as along a plane, and is sometimes also called a track. The guide rail can be provided on a platform inside the float (such as platform 810 shown in FIG. 8A) or can be provided elsewhere inside the float. The guide rail can be implemented in a variety of ways including an internal track (in which the load/vehicle fits around the track) and external track (in which the load fits inside the track such as a monorail and pictured in FIG. 12). The configuration of guide rail/track can be based on environment, lubrication, space constraints, load capacity, precision needs, weight constraints, and the like.

Linkage 1110 helps to manage forces and movement in the battery shifting system by translating energy provided by actuator 1108 (such as rotating motion) to linear motion. Linkage 1110 can be implemented by a belt, rack, or rod among other things and is further described with respect to FIG. 12.

In FIG. 11A, the center of gravity (CG) is at the location shown, which is at the center of the group of batteries 1106.1, 1106.2, and 1106.3. One or more of the batteries can be shifted to change the CG. The following figure shows a different state of the system in which the CG is shifted to a new position (CG') by the actuator and linkage moving the batteries along the guide rail.

FIG. 11B is a diagram of a system for shifting batteries for center of gravity control in a second state. Here, the center of gravity has been shifted to the right relative to the state shown in FIG. 11A. The new center of gravity is CG'. The shifting can be triggered by a flight computer or controller as described with respect to FIG. 7, and the shifting can be carried out by an actuator 1108. In some embodiments, a group of batteries is shifted together and spacing between each battery is maintained from a first position to a second position. In some embodiments, one or more batteries can be shifted independently from other batteries so that the spacing between some of the batteries may change. In FIG. 11B, batteries 1106.2 and 1106.3 are closer to each other compared with battery 1106.1 This may allow for more sophisticated/granular control of CG shifting.

The number and placement of actuators and batteries in FIGS. 11A and 11B is exemplary and not intended to be limiting. For example, more than one actuator may be used and fewer or additional batteries may be provided in the battery shifting system.

The batteries can be shifted along the guide rail in a variety of ways. By way of non-limiting example, the guide rail and actuator can include a belt, lead screw, rack and pinion, and linear actuator. Each of these examples are further described in the following figure.

FIG. 12 is a diagram of a guide rail and linkage for shifting batteries for center of gravity control. This diagram shows a portion of a guide rail and linkage, and can be used to implement the guide rail and linkage shown in FIGS. 11A and 11B. The batteries are not shown here, but the linkage 1210 is adapted to support one or more batteries (they would sit on top of the linkage) and move the batteries along the guide rail.

The guide rail includes a center portion 1204.1 and side portions 1204.2 and 1204.3. The center portion is adapted to fit inside a portion of linkage 1210 as more clearly illustrated in the close-up view inside the dashed circle. This is an example of an external track because the load (linkage 1210) fits inside the guide rail. The side portions 1204.2 and 1204.3 are optional and are provided here to provide more stability for the linkage 1210 by enclosing the edges of the linkage.

The guide rail and linkage can be implemented by a variety of linear actuation systems. Four examples will now be described, but these examples are not intended to be limiting. The linkage 1210 can include a belt, which is driven by an actuator. A belt may be desirable for lightweight applications because belt systems are relatively light, small, and flexible. Of the four examples described here, the belt is the smallest and lightest. However, belts can be relatively noisy/loud. An example of a belt system is a bicycle chain.

Another way to shift the batteries is with a lead screw (the linkage 1210 can include a lead screw). A lead screw is attractive when a high load carrying capacity is needed, for example, when batteries are heavier. Lead screws are stable and strong, and do not back drive. However, a lead screw (which uses sliding friction) tends to be less efficient than system that use rolling friction.

Yet another way to shift the batteries is with a rack and pinion (the linkage 1210 can include a lead screw). Racks and pinions have a good gear ratio, which means that a smaller motor (actuator) can be used to provide the same power output as some other types of actuator/linkage systems having larger motors. In a rack and pinion system, the guide rail center portion 1204.1 has teeth, and the portion of the linkage 1210 contacting the guide rail center portion also has teeth.

A fourth way to shift the batteries is with a linear actuator. Like a lead screw, a linear actuator is attractive for a higher load carrying capacities, and can be more efficient than a lead screw. In addition, linear actuators may provide better positions. However, the range of motion (distance) is limited by the length of the arm of the linear actuator.

Each of the linkage and actuator systems described above can be self-locking to hold batteries in a desired position. The systems described above may be attractive in lightweight aircraft applications because they are suited for batteries (sizes and weights) for those aircrafts. The following figures show some examples of battery shifting systems for relatively heavier aircraft, which tend to have larger and heavier batteries.

Figure 13A:
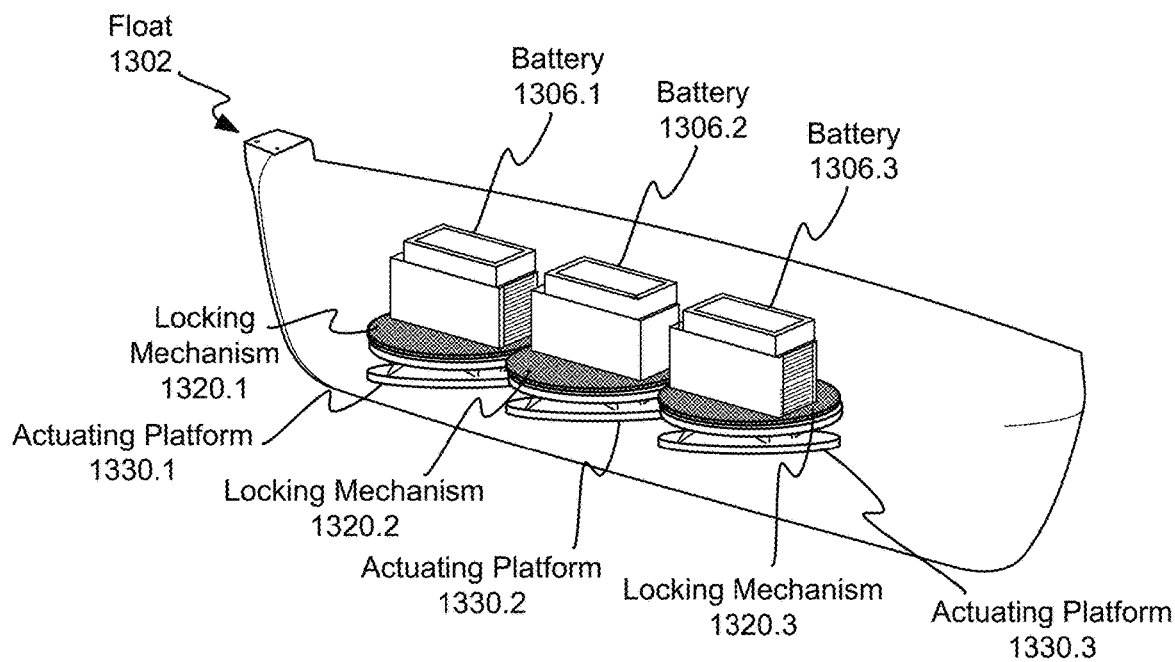
FIG. 13A is a diagram of a system for shifting batteries for center of gravity control.

FIG. 13A is a diagram of a system for shifting batteries for center of gravity control. In this example, each of the batteries 1306.1-1306.3 (generally referred to as battery 1306) has a respective actuating platform 1330.1-1330.3 (generally referred to as actuating platform 1330) and locking mechanism 1320.1-1320.3 (generally referred to as locking mechanism 1320). The system shown here may be attractive for aircraft of heavier weight or where it is desirable to move the batteries in more degrees of motion. In this example, the system is provided inside a float 1102 of an aircraft. An example of a float is described above (e.g., FIG. 3). The batteries are like their counterparts described in FIGS. 8A and 8B.

The actuating platform 1330 has six degrees of freedom and can be implemented by a Stewart platform. In the state shown in FIG. 13A, the batteries 1306.1-1306.3 are aligned. The batteries can be shifted by using the actuating platform and locking mechanism.

Figure 13B:
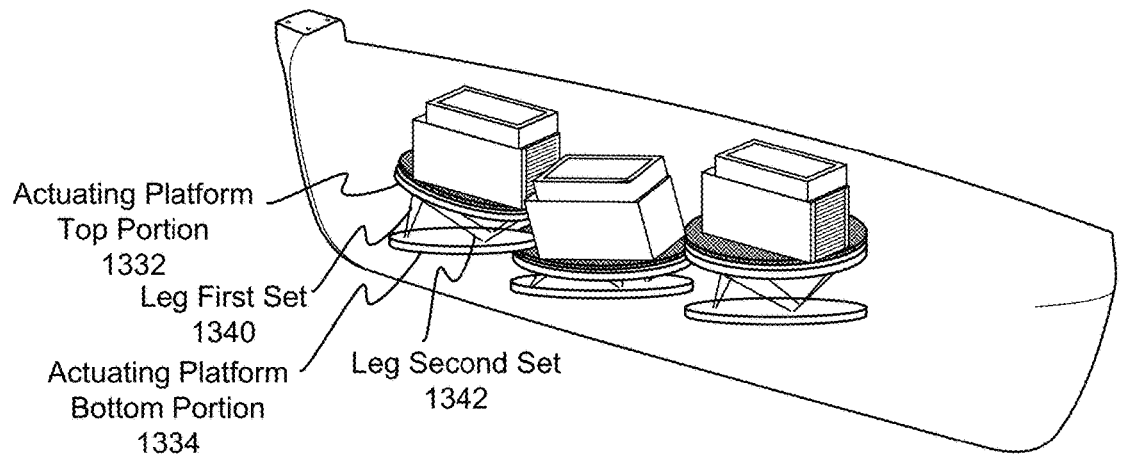
FIG. 13B is a diagram of a system for shifting batteries for center of gravity control.

FIG. 13B is a diagram of a system for shifting batteries for center of gravity control. In the state shown here, the platforms have been moved to a different position to change the positions of the batteries. Unlike the battery shifting systems described in FIG. 12 and earlier, the batteries here can be moved in greater degrees of freedom.

Each actuating platform 1330 has a top portion 1332 and a bottom portion 1334. The bottom portion remains fixed, while the top portion moves to shift the position of the battery 1306. The top portion 1332 and bottom portion 1334 are coupled by three sets of legs. In some embodiments, the legs include six prismatic actuators placed in pairs. Here, two of the sets are labeled (1340 and 1342). Each set of legs can be move independently from each other to provide motion in six degrees of freedom including three linear motions and three rotations. This allows the CG to be shifted up and down and forward and back in addition to left and right.

In various embodiments, battery 1306 moves on the top portion of the actuating platform, but the limits of battery movement can be defined by locking mechanism 1320. FIG. 15 shows an example of a locking mechanism that is compatible with the actuating mechanism shown here, shown in FIG. 14, and other actuating platforms.

The number and placement of batteries and actuating platforms is exemplary and not intended to be limiting. For example, more than one battery can share (be provided on) a single actuating platform.

Figure 14:
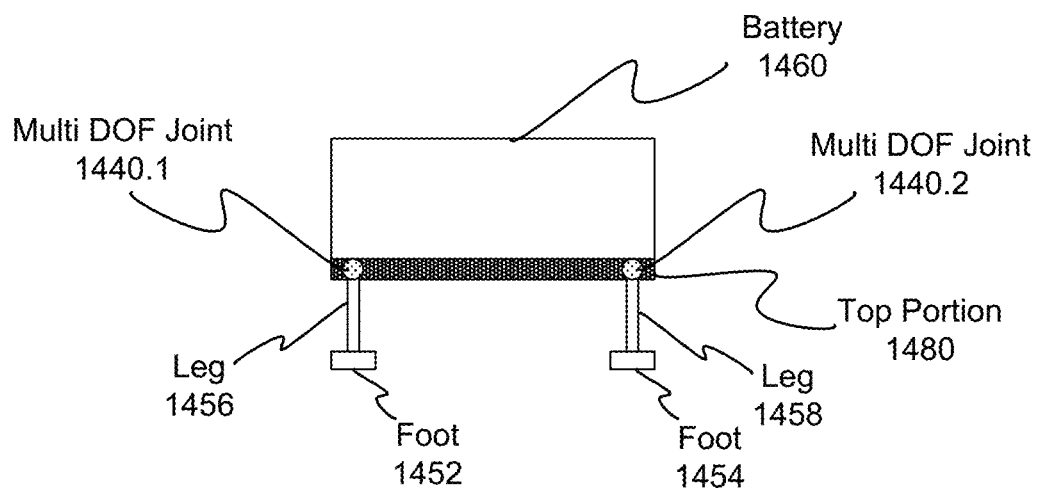
FIG. 14 is a diagram of an embodiment of an actuating platform with five degrees of freedom.
Figure 15:
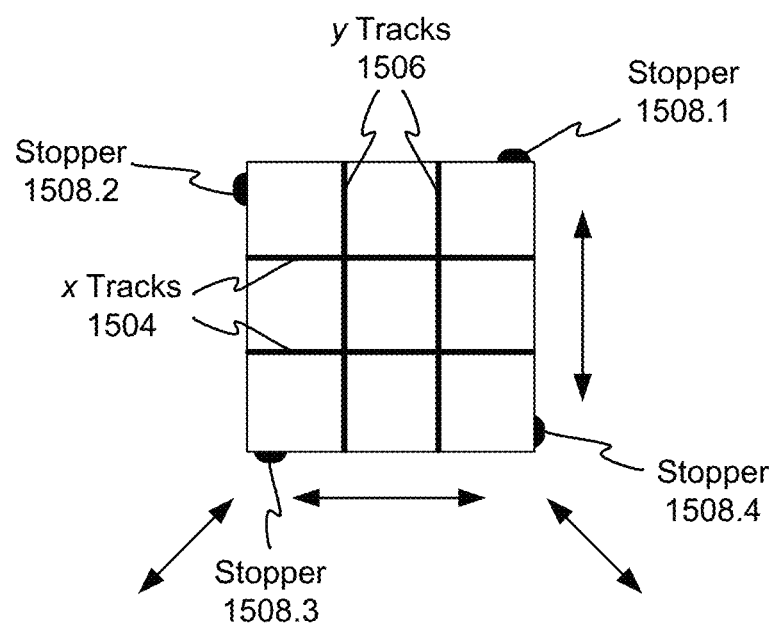
FIG. 15 is a diagram of a locking mechanism for a battery shifting system.

FIG. 14 is a diagram of an embodiment of an actuating platform with five degrees of freedom. This shows a side view of an actuating platform that can be provided in a system such as the one shown in FIGS. 13A and 13B to take the place of actuating platform 1330. Unlike the actuating platform shown in FIGS. 13A and 13B, the actuating platform here has five degrees of freedom. This may be an attractive option because it is more lightweight than the example shown above while still providing greater degrees of freedom than the example of FIGS. 11A and 11B.

The actuating platform shown here has the same motions as the Stewart platform except no up and down motion. That is, the platform provides two linear motions and three rotations. The assembly shown here includes a top portion 1480 adapted to support battery 1460. The top portion 1480 is joined to feet 1452 and 1454 by legs 1456 and 1458 via respective multi degree of freedom (DOF) joints 1440.1 and 1440.2. The legs 1456 and 1458 are adapted to move independently from each other via their respective balljoints. Although not shown here, a locking mechanism may be provided between the battery and the top potion 1480. The locking mechanism arrests the fall or limits the motion of the battery, as further described in the example below.

FIG. 15 is a diagram of a locking mechanism for a battery shifting system. This diagram is a top-down view with arrows indicating the permitted directions of motion. The locking mechanism may include one or more tracks to guide motion of a load (e.g., a battery). Here, two sets of tracks are shown. The x-tracks 1504 guide motion along the x-axis, and the y-tracks 1506 guide motion along the y-axis. Additional tracks (not shown) may guide diagonal motion. A load (e.g., battery) on the locking mechanism is free to move until it hits a stopper (1508.1-1508.4). Here, one stopper is provided on each side of the locking mechanism. Stopper 1508.1 prevents the load from sliding off the locking mechanism in the positive-x direction, stopper 1508.3 prevents the load from sliding off the locking mechanism in the negative-x direction, stopper 1508.2 prevents the load from sliding off the locking mechanism in the positive-y direction, and stopper 1508.4 prevents the load from sliding off the locking mechanism in the negative-y direction.

This locking mechanism can be provided in the systems shown above to allow batteries to passively move to a position defined by the stopper. This can replace or assist the motion provided by an actuator to shift batteries for center of gravity control. The battery slides into place due to its own weight (and no motor is required). The stopper locks the battery into place. For example, when an actuating platform is angled such as when the top portion 1132 is angled as in FIG. 13B, the battery naturally slides due to its own weight until it comes to a stop by the stopper. The stopper can release the battery by a mechanism or when there is sufficient force on the battery.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   a float for a vehicle;
   a plurality of battery holders provided in the float, wherein each of the battery holders is adapted to change between a first battery position and a second battery position in the float, and the plurality of battery holders being in the first battery position causes the vehicle to have a first center of gravity and the plurality of battery holders being in the second battery position causes the vehicle to have a second center of gravity; and
   a controller provided in the float, the controller being configured to:
      move the plurality of battery holders into the first battery position at least some of the time when the vehicle is flying at a first angle such that the vehicle has a center of gravity in a first vehicle location; and
      move the plurality of battery holders into the second battery position at least some of the time when the vehicle is flying at a second angle such that the vehicle has a center of gravity in a second vehicle location;
   wherein each of the battery holders is configured to move independently from each other.

2. The system of claim 1, wherein each of the first angle and the second angle includes at least one of a pitch angle and a roll angle.

3. The system of claim 1, wherein movement of the plurality of battery holders between the first battery position and the second battery position aligns a center of thrust and the center of gravity along a vertical axis of the vehicle.

4. The system of claim 1, wherein movement of the plurality of battery holders between the first battery position and the second battery position reduces a load on a rotor of the vehicle.

5. The system of claim 1, wherein:
   the vehicle includes a plurality of rotors that are attached to the vehicle at a fixed roll angle and a fixed pitch angle; and
   the plurality of battery holders is adapted to move along a guide rail to align a center of thrust of the vehicle of a center of gravity align a vertical axis of the vehicle.

6. The system of claim 1, further comprising an actuator adapted to move the plurality of battery holders along a guide rail.

7. The system of claim 6, wherein the actuator is mechanical.

8. The system of claim 6, wherein the actuator is electrical.

9. The system of claim 6, wherein the actuator includes at least one of: a belt and pulley, a lead screw, a rack and pin, and a linear actuator.

10. The system of claim 1, further comprising an actuating platform adapted to receive at least one of the plurality of battery holders, wherein the actuating platform is adapted to move the at least one of the plurality of battery holders between the first battery position and the second battery position.

11. The system of claim 10, further comprising a second actuating platform and a second battery holder, wherein each of the battery holders has a respective actuating platform.

12. The system of claim 10, further comprising a locking mechanism provided between the plurality of battery holders and the actuating platform, wherein the locking mechanism permits motion in at least one of the x-direction and the y-direction.

13. The system of claim 10, wherein the actuating platform has at least five degrees of freedom.

14. The system of claim 13, wherein the actuating platform is a Stewart platform.

15. The system of claim 13, wherein the actuating platform includes:
   a top portion adapted to support at least one of the plurality of battery holders; and
   at least two legs independently joined to the top portion by a respective multi degrees of freedom joint, the at least two legs adapted to move independently of each other.

16. The system of claim 10, further comprising a locking mechanism provided between the plurality of battery holders and the actuating platform, wherein the locking mechanism includes at least one stopper to interrupt sliding motion of the battery.

17. The system of claim 16, wherein the locking mechanism includes a stopper to interrupt sliding motion of the plurality of battery holders for each direction of motion.

18. A method comprising:
   providing a float for a vehicle;
   providing a plurality of battery holders in the float, wherein each of the battery holders is adapted to change between a first battery position and a second battery position in the float, and the plurality of battery holders being in the first battery position causes the vehicle to have a first center of gravity and the plurality of battery holders being in the second battery position causes the vehicle to have a second center of gravity; and providing a controller in the float, the controller being configured to:

move the plurality of battery holders into the first battery position at least some of the time when the vehicle is flying at a first angle such that the vehicle has a center of gravity in a first vehicle location; and move the plurality of battery holders into the second battery position at least some of the time when the vehicle is flying at a second angle such that the vehicle has a center of gravity in a second vehicle location;

wherein each of the battery holders is configured to move independently from each other.

19. The method of claim 18, wherein movement of the plurality of battery holders between the first battery position and the second battery position aligns a center of thrust and the center of gravity along a vertical axis of the vehicle.

* * * * *

UNITED STATES PATENT AND TRADEMARK OFFICE
CERTIFICATE OF CORRECTION

PATENT NO. : 10,543,905 B1
APPLICATION NO. : 16/267875
DATED : January 28, 2020
INVENTOR(S) : Dennis Young Kwon and Madeline Elliott Parker It is certified that error appears in the above-identified patent and that said Letters Patent is hereby corrected as shown below:

In the Specification

In Column 15, Line(s) 59, delete "They-axis" and insert --The y-axis--, therefor.
In Column 16, Line(s) 7, after "threshold", delete "TO" and insert --T0--, therefor.
In Column 16, Line(s) 7, after "position", delete "TO" and insert --T0--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*